United States Patent
Joo et al.

(10) Patent No.: US 11,636,629 B2
(45) Date of Patent: Apr. 25, 2023

(54) METHOD AND APPARATUS FOR RENDERING OBJECT USING EDGE COMPUTING SERVICE

(71) Applicant: SAMSUNG ELECTRONICS CO., LTD., Suwon-si (KR)

(72) Inventors: Younghyun Joo, Suwon-si (KR); Younggi Kim, Suwon-si (KR); Sangeun Seo, Suwon-si (KR); Jaewook Jung, Suwon-si (KR); Hyoyoung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 17/178,605

(22) Filed: Feb. 18, 2021

(65) Prior Publication Data

US 2021/0264643 A1 Aug. 26, 2021

(30) Foreign Application Priority Data

Feb. 21, 2020 (KR) .................. 10-2020-0021765

(51) Int. Cl.
*G06T 11/00* (2006.01)
*H04L 67/10* (2022.01)
*G06F 3/14* (2006.01)

(52) U.S. Cl.
CPC ............... *G06T 11/00* (2013.01); *G06F 3/14* (2013.01); *H04L 67/10* (2013.01)

(58) Field of Classification Search
CPC .................................. G06F 3/14; H04L 67/10
See application file for complete search history.

(56) References Cited

U.S. PATENT DOCUMENTS

| 8,858,324 B2 | 10/2014 | Kruglick |
| 2015/0002542 A1* | 1/2015 | Chan .................... G02B 27/017 345/633 |
| 2018/0220119 A1* | 8/2018 | Horvitz .......... H04N 21/234363 |

FOREIGN PATENT DOCUMENTS

KR 10-1923177 11/2018

* cited by examiner

*Primary Examiner* — Michelle L Sams
(74) *Attorney, Agent, or Firm* — Nixon & Vanderhye, P.C.

(57) ABSTRACT

Example embodiments provide a method, performed by an edge data network, of rendering an object, and a method of displaying an object rendered on a device. The edge data network may generate a second metadata set corresponding to a predicted position and direction of a device based on a first metadata set, and render a first object corresponding to the second metadata set. Furthermore, the edge data network may receive, from the device, a third metadata set corresponding to the current position and direction of the device, obtain a rendered object corresponding to the current position and direction of the device based on the second metadata set and the third metadata set, and transmit the obtained rendered object to the device.

11 Claims, 18 Drawing Sheets

METHOD AND APPARATUS FOR RENDERING OBJECT USING EDGE COMPUTING SERVICE

CROSS-REFERENCE TO RELATED APPLICATION

This application is based on and claims priority under 35 U.S.C. § 119 to Korean Patent Application No. 10-2020-0021765, filed on Feb. 21, 2020, in the Korean Intellectual Property Office, the disclosure of which is incorporated by reference herein in its entirety.

BACKGROUND

1. Field

The disclosure relates to a method and an apparatus for rendering an object using an edge computing service (e.g., a multi-access edge computing (MEC) service).

2. Description of Related Art

Recently, edge computing technology for transmitting data using an edge server has been discussed. The edge computing technology may include, for example, multi-access edge computing (MEC) or fog computing (FOC). The edge computing technology may refer to a technology of providing data to a device from a separate server (hereinafter, referred to as an "edge data network" or an "MEC server") at a location geographically close to the device, for example, the separate server being installed inside or near a base station. For example, an application that requires low latency, from among at least one application installed in a device, may transmit and receive data to and from through an edge server installed at a geographically close location, without using a server arranged in an external data network (DN) (e.g., the Internet).

Recently, services (hereinafter, referred to as 'MEC-based services' or 'MEC services') using edge computing technology have been discussed, and research and development for devices that support the MEC-based services are being conducted. For example, an application of the device may transmit and receive edge computing-based data to and from an edge server (or an application of the edge server) on an application layer.

As research and development for supporting an MEC-based service have progressed, technologies for providing high resolution image content without and/or with reduced delay to an electronic device using the MEC have been discussed.

SUMMARY

Embodiments of the disclosure provide a method and an apparatus for rendering an object using an edge computing service.

For example, embodiments of the disclosure provide a method of rendering an object corresponding to a device position predicted by an edge data network.

Embodiments of the disclosure also provide a method by which an edge data network receives metadata from a device, generates metadata corresponding to a predicted position of the device, and renders an object based on the metadata.

Embodiments of the disclosure also provide a device for receiving and displaying a rendered object from an edge data network.

Additional aspects will be set forth in part in the description which follows and, in part, will be apparent from the description.

Embodiments of the disclosure provide a method of rendering an object, and an edge data network for rendering an object. According to an example embodiment, a method, performed by an edge data network, of rendering an object may include generating a second metadata set corresponding to a position and direction of a device predicted based on a first metadata set, rendering a first object corresponding to the second metadata set, receiving, from the device, a third metadata set corresponding to a current position and direction of the device, obtaining a rendered object corresponding to the position and direction of the device, based on the second metadata set and the third metadata set, and transmitting the obtained rendered object to the device. The first metadata set may include at least one piece of metadata that is received from the device before the third metadata set is received.

Embodiments of the disclosure also provide a method of displaying a rendered object, and a device for displaying a rendered object. According to an example embodiment, a method of displaying, by a device, a rendered object on the device may include obtaining current position information and current direction information of a device, generating a third metadata set corresponding to the current position information and the current direction information, transmitting the third metadata set to an edge data network, receiving, from the edge data network, a rendered object corresponding to a current position and direction of the device based on the third metadata set, and displaying the rendered object on a screen of the device.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
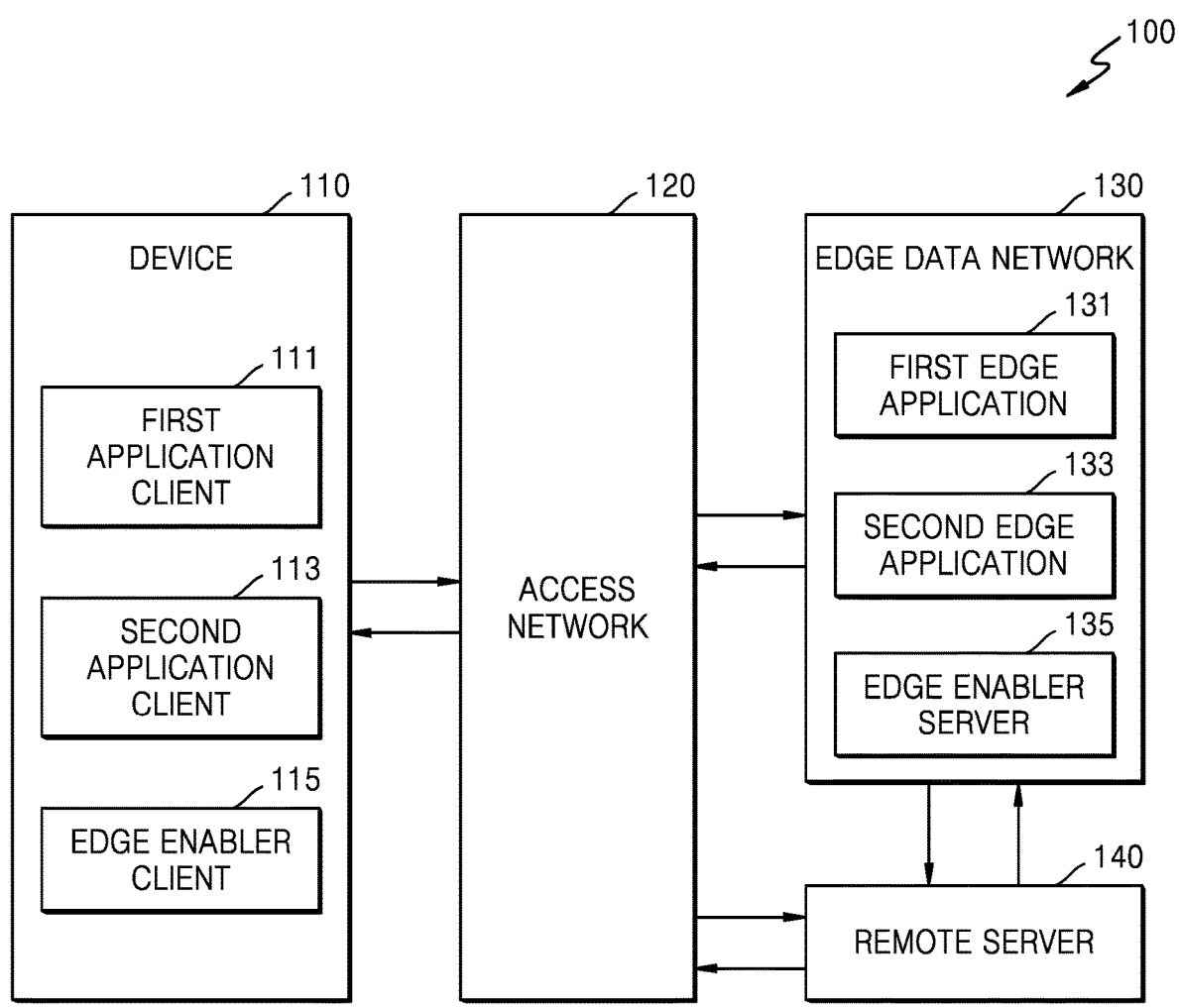
FIG. 1 is a diagram schematically illustrating example multi-access edge computing (MEC) technology in a network environment, according to various embodiments.

Hereinafter, various example embodiments will be described in greater detail with reference to the accompanying drawings.

In describing the various example embodiments, descriptions of technologies which are already known to those skilled in the art and are not directly related to the disclosure may be omitted.

In the accompanying drawings, some elements may be exaggerated, omitted, or schematically illustrated. Further, the size of each element may not entirely reflect the actual size. In the drawings, identical or corresponding elements are provided with identical reference numerals.

The advantages and features of the disclosure and illustrative ways to achieve them will be apparent by making reference to the example embodiments as described below in detail in conjunction with the accompanying drawings. However, the disclosure is not limited to the various example embodiments described below, but may be implemented in various different forms. The embodiments are illustrative and non-limiting, and will inform a person of ordinary skill in the art to which the disclosure pertains of the full scope of the disclosure.

Throughout the disclosure, the expression "at least one of a, b or c" indicates only a, only b, only c, both a and b, both a and c, both b and c, all of a, b, and c, or variations thereof.

Here, it will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus, such that the instructions, which are executed via the processor of the computer or other programmable data processing apparatus, create means for implementing the functions specified in the flowchart block(s). These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block(s).

In addition, each block of the flowchart illustrations may represent a module, segment, or portion of code, which includes one or more executable instructions for implementing the specified logical function(s). It should also be noted that in some alternative implementations, the functions noted in the blocks may occur in a different order. For example, two blocks shown in succession may in fact be executed substantially concurrently or the blocks may sometimes be executed in the reverse order, depending upon the functionality involved.

As used herein, the term "unit" may refer, for example, to a software element or a hardware element, such as a field programmable gate array (FPGA) or an application specific integrated circuit (ASIC), which performs a predetermined function. However, the "unit" may not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of program code, drivers, firmware, micro-code, circuits, data, database, data structures, tables, arrays, and parameters. The elements and functions provided by the "unit" may be either combined into a smaller number of elements or "units", or divided into a larger number of elements or "units". Moreover, the elements and "units" may be implemented to reproduce one or more CPUs within a device or a security multimedia card. In addition, in various embodiments, the "unit" may include one or more processors.

FIG. 1 is a diagram schematically illustrating example multi-access edge computing (MEC) technology in a network environment according to various embodiments.

Referring to FIG. 1, a network environment 100 may include a device 110, an access network (AN) 120, an edge data network 130, and a remote server 140. However, a configuration included in the network environment 100 is not limited to the configuration illustrated in FIG. 1.

According to various embodiments, each of the elements included in the network environment 100 may be a physical entity unit or a software or module unit capable of performing an individual function.

According to various embodiments, the device 110 may refer to a device used by a user. For example, the device 110 may be a terminal, user equipment (UE), a mobile station, a subscriber station, a remote terminal, a wireless terminal, or a user device. Referring to FIG. 1, the device 110 may include a first application client (or an application client) 111, a second application client 113, and an edge enabler client (or a MEC enabling layer (MEL)) 115. The device 110 may perform operations to use a MEC service, using the edge enabler client 115. The edge enabler client 115 will be described in greater detail below.

According to various embodiments, the device 110 may execute a plurality of applications. For example, the device 110 may execute the first application client 111 and the second application client 113. The plurality of applications may require different network services based on at least one of a required data transmission rate, latency (or speed), reliability, the number of devices accessed a network, network access cycle of the device 110, or average data usage. The different network services may include, for example, enhanced mobile broadband (eMBB), ultra-reliable and low latency communication (URLLC), or massive machine type communication (mMTC).

An application client of the device 110 may refer, for example, to a basic application installed in advance in the device 110 or an application provided by a third party. That is, the application client may refer to a client application program that is executed in the device 110 for a specific application service. A plurality of application clients may be executed in the device 110. At least one of the application clients may use a service provided by the edge data network 130. For example, the application client may be an application installed and executed in the device 110 to provide a function of transmitting and receiving data through the edge data network 130. The application client of the device 110 may be application software executed on the device 110 to use functionality provided by one or more specific edge applications.

According to various embodiments, the plurality of applications 111 and 113 of the device 110 may perform data transmission and reception with the remote server 140 based on a required network service type, or may perform data transmission and reception with the edge data network 130 based on edge computing. For example, in a case in which the first application client 111 does not require low latency, the first application client 111 may perform data transmission and reception with the remote server 140. As another example, in a case in which the second application client 113 requires low latency, the second application client 113 may perform MEC-based data transmission and reception with the edge data network 130.

According to various embodiments, an application of the device 110 may be referred to as an application client, a client application (client app), or a UE application (UE app). For convenience, throughout the disclosure, an application of the device 110 is referred to as an application client.

According to various embodiments, the access network 120 may provide a channel for wireless communication with the device 110. For example, the access network 120 may be a radio access network (RAN), a base station, an eNodeB (eNB), a 5th generation (5G) node, a transmission/reception point (TRP), or a 5G NodeB (5GNB).

According to various embodiments, the edge data network 130 may refer, for example, to a server that the device 110 accesses to use the MEC service. The edge data network 130 may be installed at a location geographically close to the device, for example, a location within or near a base station. According to various embodiments, the edge data network 130 may transmit and receive data to and from the device 110 without passing through an external data network (DN) (e.g., the Internet). In various embodiments, MEC may be referred to as multi-access edge computing or mobile-edge computing.

According to various embodiments, the edge data network 130 may be referred to as an MEC host, an edge computing server, a mobile edge host, an edge computing platform, an MEC server, etc. For convenience, hereinafter, the edge data network 130 is referred to as an MEC server. Referring to FIG. 1, the edge data network 130 may include a first edge application 131, a second edge application 133, and an edge enabler server (or a MEC platform (MEP)) 135. The edge enabler server 135 is configured to provide the MEC service or to control traffic in the edge data network 130, and will be described in greater detail below.

According to various embodiments, the edge data network 130 may execute a plurality of applications. For example, the edge data network 130 may execute the first edge application 131 and the second edge application 133. According to various embodiments, the edge application may refer, for example, to an application provided by a third party in the edge data network providing the MEC service. The edge application may be used to establish a data session with the application client to transmit and receive data related to the application client. That is, the edge application may establish a data session with the application client. In various embodiments, data session may refer to a communication path through which the application client of the device 110 and the edge application of the edge data network 130 transmit and receive data.

According to various embodiments, the application of the edge data network 130 may be referred to as an MEC application (MEC app), an ME (MEC) app, an edge application server, and an edge application. For convenience, throughout the disclosure, an application of the edge data network 130 is referred to as an edge application. Here, although the edge application is described as an application, the edge application may refer to an application server existing in the edge data network.

According to various embodiments, the remote server 140 may provide content related to an application. For example, the remote server 140 may be managed by a content provider. According to various embodiments, the remote server 140 may transmit and receive data to and from the device 110 through an external data network (DN) (e.g., the Internet).

Although not shown in FIG. 1, a core network (CN) or a data network (DN) may exist between the access network 120 and the edge data network 130. According to various embodiments, the data network may provide a service (e.g., an Internet service, an IP multimedia subsystem (IMS) service) by transmitting and receiving data (or a data packet) to and from the device 110 through the core network and the access network 120. For example, the data network may be managed by a communication provider. In various embodiments, the edge data network 130 may be connected to the access network 120 or the core network through the data network (e.g., a local DN).

Figure 2:
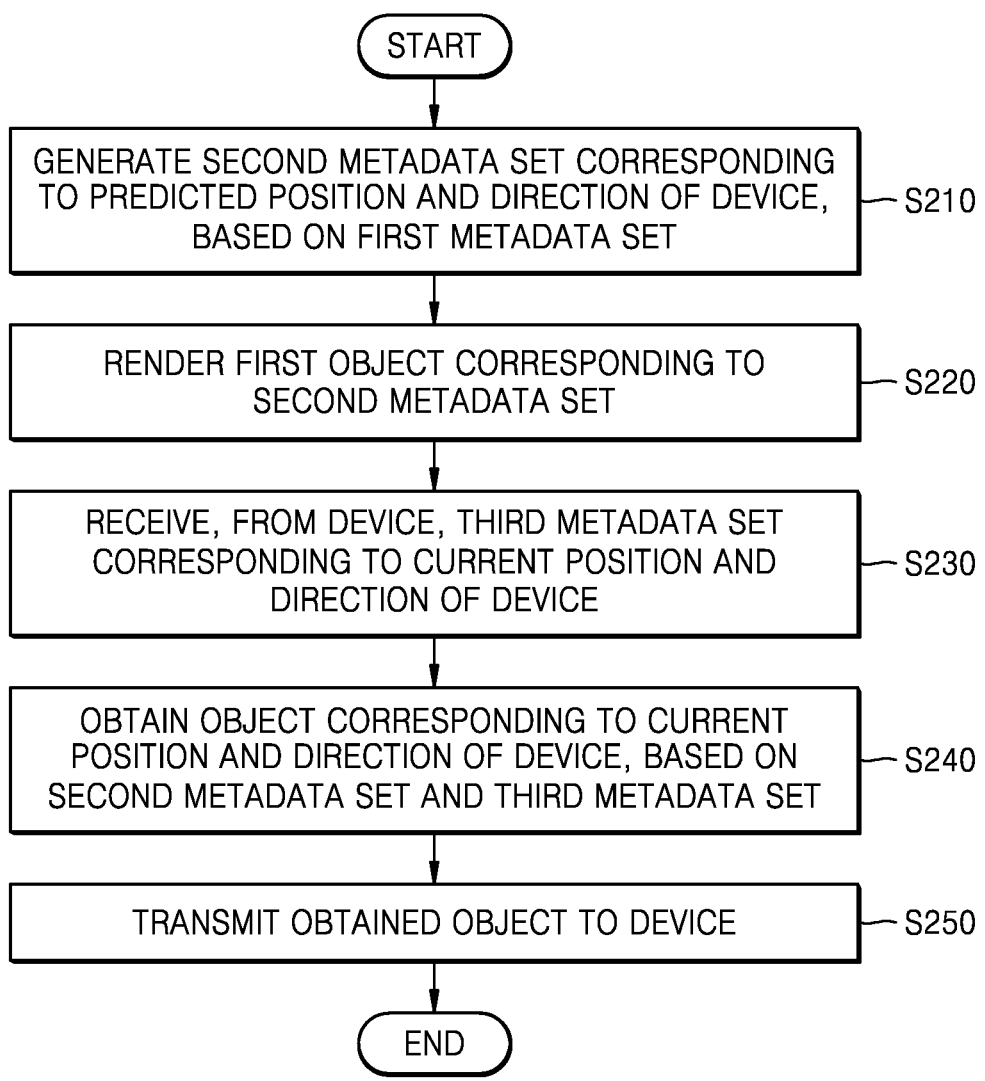
FIG. 2 is a flowchart illustrating an example method of rendering an object by an edge data network, according to various embodiments.

FIG. 2 is a flowchart illustrating an example method of rendering an object by the edge data network 130 according to various embodiments.

The edge data network 130 may manage an object. The object may refer, for example, to content overlaid and displayed on a screen of the device 110. The content may include videos, images, characters, and/or voice, but is not limited thereto.

The device 110 may transmit, to the edge data network 130, information on where the device 110 is and to where the device 100 is heading. The edge data network 130 may check the information received from the device 110, may render an object to be displayed, as viewed at a current position of the device 110, and transmit the rendered object to the device 110.

The edge data network 130 may transmit the rendered object to the device 110, rather than transmitting information on the object to the device 110 to enable the device to perform rendering based on the received information. The edge data network 130 having greater resources than the device 110 may render the object and transmit the rendered object to the device 110, and thus the device 110 may display the rendered object on the device 110 at a high speed.

In addition, the edge data network 130 may predict a destination to which the device 110 will move and a direction in which the device 110 will head. The edge data network 130 may render the object for the destination and the direction in which the device 110 will head in advance based on a predicted route and the predicted direction of the device 110.

The edge data network 130 and the device 110 may generate metadata. The edge data network 130 may predict a route and direction of the device 110 based on the metadata, and may render the object in advance. In various embodiments, the edge data network 130 and the device 110 operate based on the metadata, and additional details thereof will be provided later.

In operation S210, the edge data network 130 may generate a second metadata set corresponding to a predicted position and direction of the device, based on a first metadata set. Metadata may refer, for example, to data for checking position information and direction information of the device 110.

The first metadata set may refer, for example, to pieces of metadata that are received by the edge data network 130 from the device 110 prior to a current point of time. In this case, each piece of metadata may include a position and direction of the device 110 at each point of time. That is, each piece of metadata may include position information and direction information of the device at each point of time at which the device 110 generates the piece of metadata. That is, the edge data network 130 may obtain a first metadata set including at least one piece of metadata received from the device 110 before receiving, from the device 110, a third metadata set corresponding to a current position and direction of the device 110.

According to various embodiments, the edge data network 130 may store at least one piece of metadata received from the device 110 for a preset time period. The edge data network 130 may obtain the at least one piece of metadata received from the device 110 for the preset time period, as the first metadata set. Additional detailed descriptions are provided below with reference to FIGS. 3, 4, and 5.

The edge data network 130 may predict a direction of movement of the device based on the metadata received from the device 110, and the second metadata set may refer, for example, to data generated with respect to the predicted position and direction. The second metadata set may include position information and direction information predicted by the edge data network 130 according to movement of the device 110. The edge data network 130 may transmit, to the device 110, the object rendered based on the current position and direction of the device 110 in real time using the second metadata set. A method of generating the second metadata set are described in detail below with reference to FIGS. 5 and 6.

In operation S220, the edge data network 130 may render a first object corresponding to the second metadata set. The first object may refer, for example, to an object displayed as viewed at a predicted position of the device 110.

In operation S230, the edge data network 130 may receive, from the device, the third metadata set corresponding to the current position and direction of the device.

The third metadata set may refer, for example, to data that the device 110 transmits to the edge data network 130. Here, the third metadata set may include current position information and facing direction information of the device 110.

In operation S240, the edge data network 130 may obtain the rendered object corresponding to the current position and direction of the device 110, based on the second metadata set and the third metadata set.

According to various embodiments, the edge data network 130 may compare the second metadata set with the third metadata set.

For example, in a case in which the second metadata set is identical to the third metadata set, the edge data network 130 may obtain the rendered first object as an object corresponding to the current position and direction. The first object may refer, for example, to an object obtained based on the position and direction of the device predicted by the edge data network 130. More detailed descriptions are provided below with reference to FIGS. 7 and 8.

As another example, in a case in which the second metadata set is different from the third metadata set, the edge data network 130 may render a second object corresponding to the third metadata set. The second object may refer, for example, to an object obtained based on an actual current position and direction of the device 110 that the device 110 transmits to the edge data network 130. More detailed descriptions are provided below with reference to FIGS. 10 and 11.

In operation S250, the edge data network 130 may transmit the obtained rendered object to the device 110.

Figure 3:
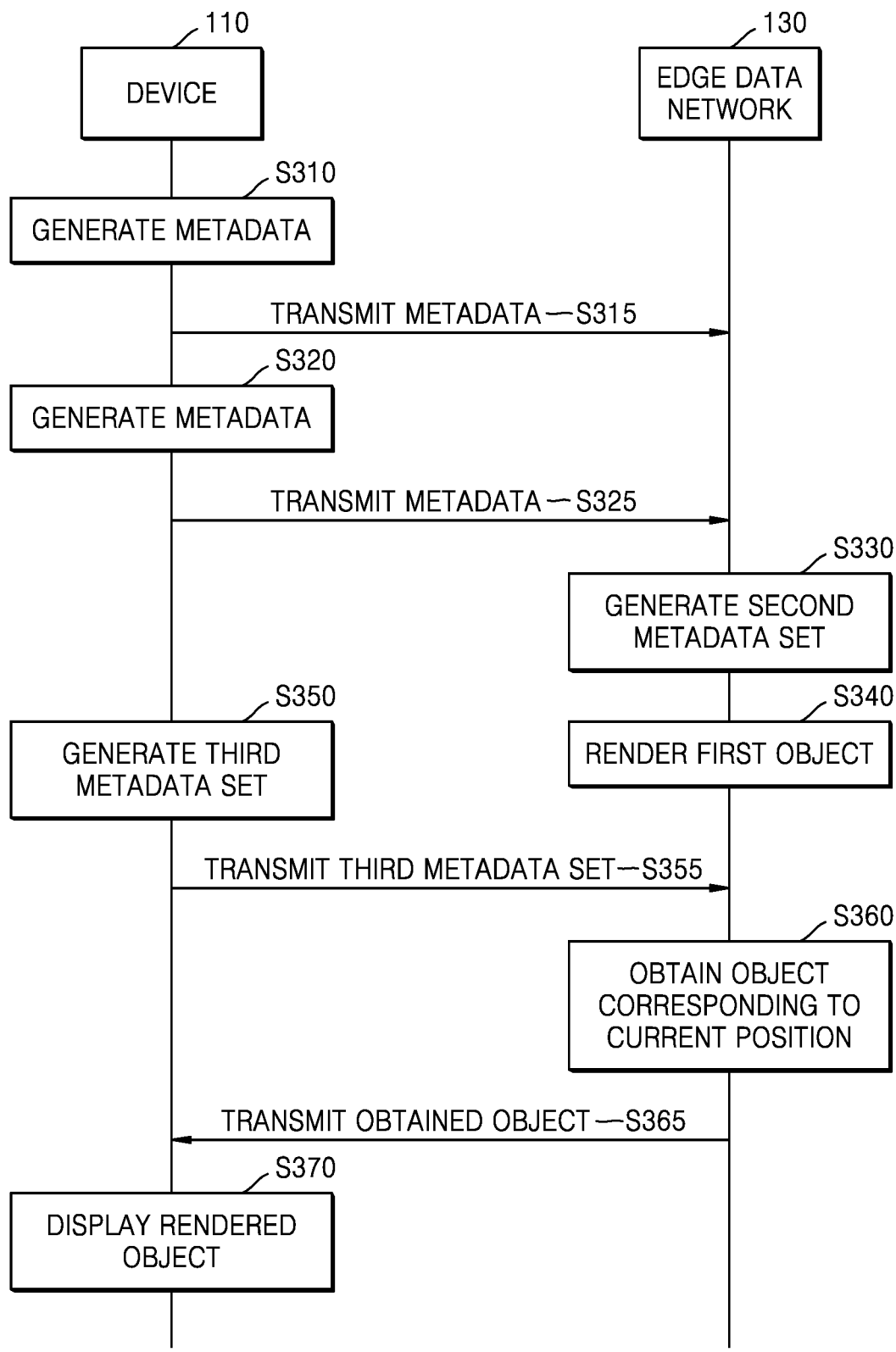
FIG. 3 is a flowchart illustrating example data transmission and reception between an edge data network and a device, according to various embodiments.

FIG. 3 is a flowchart illustrating example data transmission and reception between the edge data network 130 and the device 110, according to various embodiments.

In operations S310 through S325, the device 110 may generate the first metadata set and may transmit the first metadata set to the edge data network 130. According to various embodiments, the first metadata set may refer to metadata to be transmitted to the edge data network 130 before transmitting the third metadata set (to be described below) to the edge data network 130. For example, the third metadata set may correspond to the current position and direction, while the first metadata set may correspond to a previous position and direction. In addition, the first metadata set may include pieces of metadata each corresponding to a position and direction of the device at each of a plurality of previous time points.

For example, in operation S310, the device 110 may generate metadata corresponding to a position and direction of the device 110 at a first previous time point. In operation S315, the device 110 may transmit the metadata generated in operation S310 to the edge data network 130.

In operation S320, the device 110 may generate metadata corresponding to a position and direction of the device 110 at a second previous time point. In operation S325, the device 110 may transmit the metadata generated in operation S320 to the edge data network 130.

For convenience of descriptions, FIG. 3 illustrates an example in which the device 110 transmits metadata twice before transmitting the third metadata set, but the disclosure is not limited thereto. The device 110 may transmit at least one piece of metadata before transmitting the third metadata set, and each piece of metadata corresponds to a position and direction of the device 110 at a corresponding time point. The at least one piece of metadata that the device 110 transmits to the edge data network 130 before transmitting the third metadata set may be included in the first metadata set.

A period for transmitting, by the device 110, pieces of metadata included in the first metadata set to the edge data network 130 may be preset. Alternatively, when the position and direction of the device 110 are changed by greater than or equal to a preset range, the device 110 may transmit the pieces of metadata included in the first metadata set to the edge data network 130.

In operation S330, the edge data network 130 may generate the second metadata set corresponding to the predicted position and direction of the device 110, based on the first metadata set. Additional detailed descriptions are provided below with reference to FIGS. 5 and 6.

In operation S340, the edge data network 130 may render the first object corresponding to the second metadata set. More detailed descriptions are provided below with reference to FIGS. 7 and 8.

In operation S350, the device 110 may generate the third metadata set corresponding to the current position and direction (the position and direction of the device 110 at a current time point). More detailed descriptions are provided below with reference to FIG. 12. For convenient description, FIG. 3 illustrates that the third metadata set is generated after the second metadata set is generated and the first object is rendered, but this is merely an example. The generation of the third metadata set in operation S350 may be performed before the generation of the second metadata set in operation S330. Alternatively, the generation of the third metadata set in operation S350 may be performed after the generation of the second metadata set in operation S330 and before the rendering of the first object in operation S340.

In operation S355, the device 110 may transmit the third metadata set to the edge data network 130.

In operation S360, the edge data network 130 may obtain the rendered object corresponding to the current position and direction of the device 110, based on the second metadata set and the third metadata set. More detailed descriptions are provided below with reference to FIGS. 9 and 10.

In operation S365, the edge data network 130 may transmit the obtained rendered object to the device 110.

In operation S370, the device 110 may display the rendered object received from the edge data network 130. More detailed description is provided below with reference to FIGS. 12 and 13.

Figure 4:
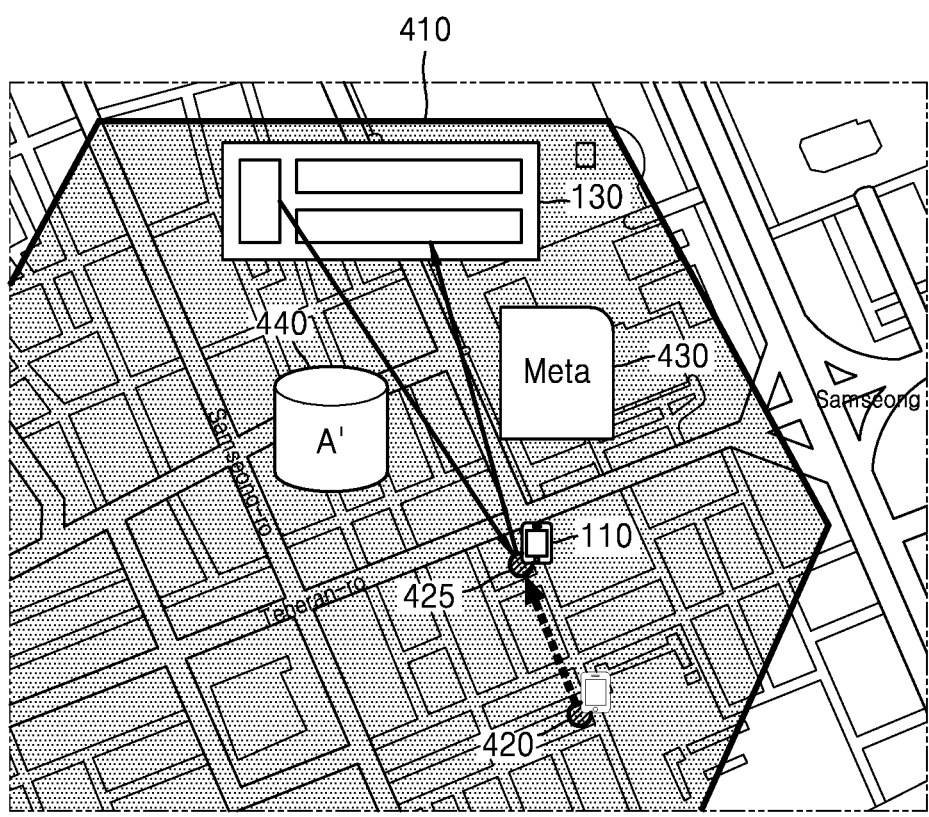
FIG. 4 is a diagram illustrating an example concept in which an edge data network renders an object, according to various embodiments.

FIG. 4 is a diagram illustrating an example concept in which the edge data network 130 renders an object according to various embodiments.

A region 410 may be allocated to and managed by each edge data network 130.

Regions may be allocated to and managed by a plurality of edge data networks 130, however, the regions allocated to each of the edge data networks 130 may not necessarily be distinguished from each other. That is, the region 410 managed by the edge data network 130 may overlap a region managed by another edge data network 130.

For convenient description, it may be assumed that the device 110 has moved from a first position 420 to a second position 425. In addition, for convenient description, the first position 420 may be a position of the device 110 at a previous time point, and the second position 425 may be a position of the device 110 at the current time point.

The edge data network 130 may receive, from the device 110, the third metadata set 430 corresponding to the second position 425 that is the current position of the device 110. This may correspond to operation S230.

The edge data network 130 may generate the second metadata set based on at least one piece of metadata received from the device 110 before the device 110 arrives at the second position 425. That is, according to various embodiments, the metadata generated by the device 110 at the first position 420 with respect to the first position 420 may be included in the first metadata set. The edge data network 130 may generate the second metadata set based on the first metadata set generated by the device 110 at the first position 420. This may correspond to operation S210.

The edge data network 130 may compare the third metadata set 430 received from the device 110 with the generated second metadata set. This may correspond to operation S240.

In a case in which the third metadata set 430 is identical to the second metadata set, the edge data network 130 may transmit, to the device 110, the rendered first object 440 corresponding to the second metadata set. In various embodiments, whether the third metadata set and the second metadata set are identical may be determined according to a predetermined criterion (e.g., a predetermined value, a predetermined ratio). For example, the third metadata set and the second metadata set may be considered identical, in case a similarity between the third metadata set and the second metadata set is equal to or greater than the predetermined value. As another example, the third metadata set and the second metadata set may be considered identical, in case that the difference between the third metadata set and the second metadata set is less than some predetermined difference.

In the following figures, an example method of generating the second metadata set and a method of obtaining the rendered object, by the edge data network 130 will be described in greater detail.

Figure 5:
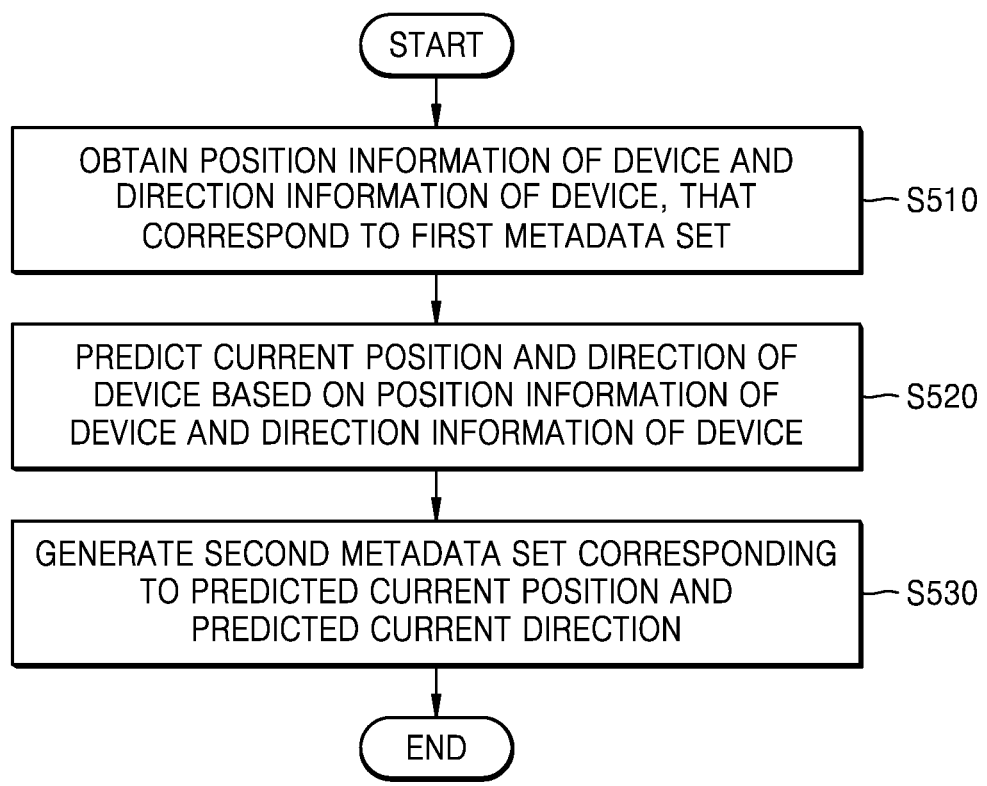
FIG. 5 is a flowchart illustrating an example method of generating a second metadata set by an edge data network, according to various embodiments.

FIG. 5 is a flowchart illustrating an example method of generating a second metadata set by the edge data network 130 according to various embodiments.

In operation S510, the edge data network 130 may obtain the position information of the device 110 and the direction information of the device 110, that correspond to the first metadata set. More specifically, the edge data network 130 may obtain the position information of the device 110 and the direction information of the device 110, that correspond to each piece of metadata included in the first metadata set.

The position information of the device 110 corresponding to each piece of metadata included in the first metadata set may refer, for example, to information that may objectively indicate a position of the device 110 when each piece of metadata is generated.

The direction information of the device 110 corresponding to each piece of metadata included in the first metadata set may refer, for example, to information that may objectively indicate a direction that the device 110 faces when each piece of metadata is generated. In a case in which the device 110 includes a photographing unit (e.g., a camera), the direction information of the device 110 may refer to a direction that the photographing unit of the device 110 faces. In addition, the direction information of the device 110 may be information on a direction in which an image being obtained or being captured by the device 110 is viewed based on a specific position of the device 110.

That is, the edge data network 130 may obtain the position information of the device 110 and the direction information of the device 110 corresponding to each time point, from the at least one piece of metadata received from the device 110.

In operation S520, the edge data network 130 may predict the current position and direction of the device 110 based on the position information of the device 110 and the direction information of the device 110.

The edge data network 130 may predict the direction of movement of the device 110 based on at least one piece of position information and direction information of the device 110. That is, the edge data network 130 may predict the destination and the direction of movement of the device 110 by analyzing routes and directions of movement of the device 110 accumulated for a preset time period.

In operation S530, the edge data network 130 may generate the second metadata set corresponding to predicted current position information and predicted current direction information.

The edge data network 130 may generate the second metadata set to correspond to the current position and the direction information of the device 110 which are predicted by predicting the route of the device 110.

Figure 6:
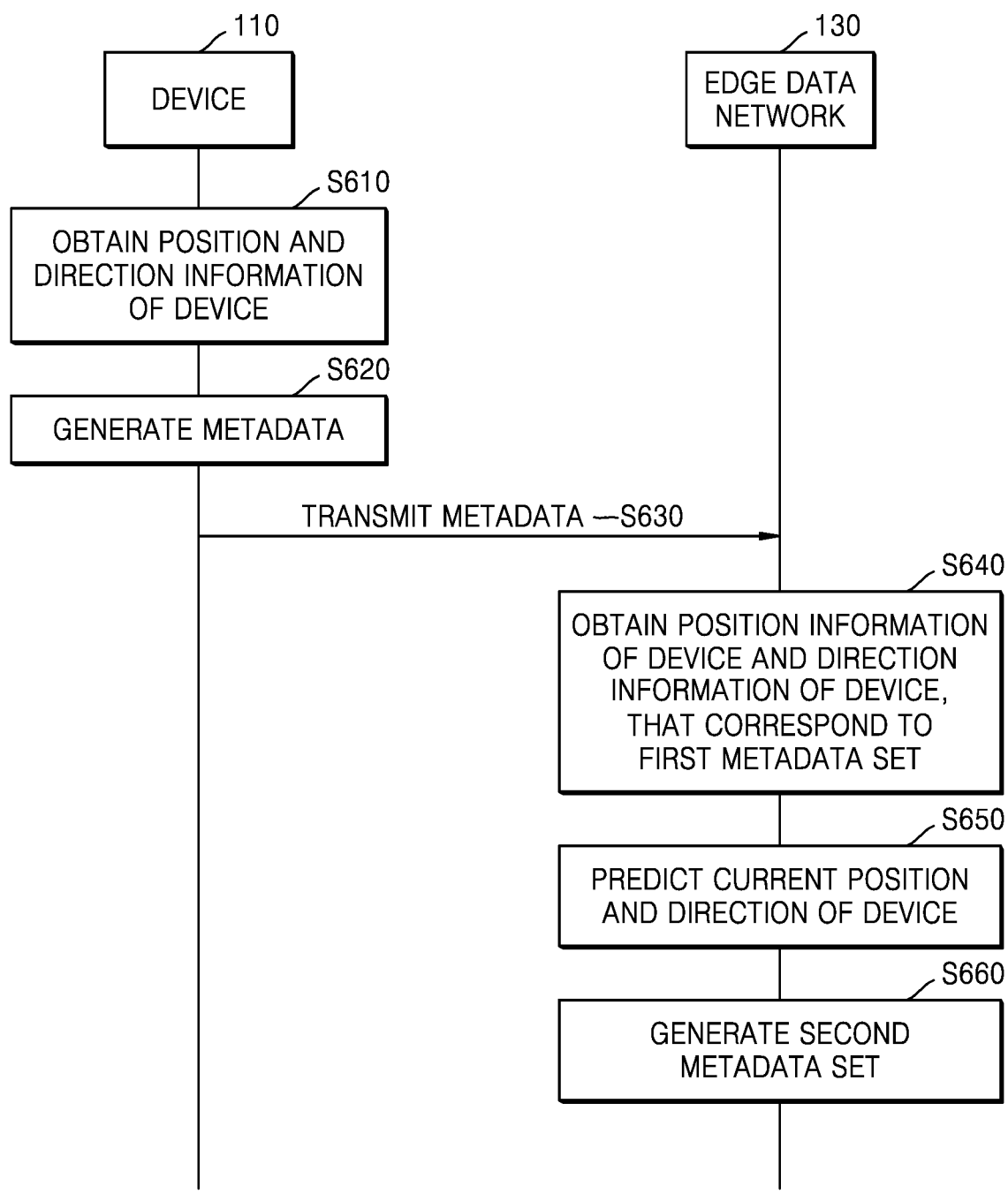
FIG. 6 is a flowchart illustrating example data transmission and reception between an edge data network and a device when the edge data network generates a second metadata set, according to various embodiments.

FIG. 6 is a flowchart illustrating example data transmission and reception between the edge data network 130 and the device 110 when the edge data network generates a second metadata set, according to various embodiments.

In operation S610, the device 110 may obtain information on the position and direction of the device 110. In operation S620, the device 110 may generate metadata corresponding to the position and direction information of the device 110. For example, the metadata generated by the device 110 may be the first metadata set. In operation S630, the device 110 may transmit the metadata to the edge data network 130.

In operation S640, the edge data network 130 may obtain the position information of the device 110 and the direction information of the device 110, which correspond to each piece of metadata included in the first metadata set. This may correspond to operation S510.

In operation S650, the edge data network 130 may predict the current position and direction of the device 110. This may correspond to operation S520.

In operation S660, the edge data network 130 may generate the second metadata set. This may correspond to operation S530.

Figure 7:
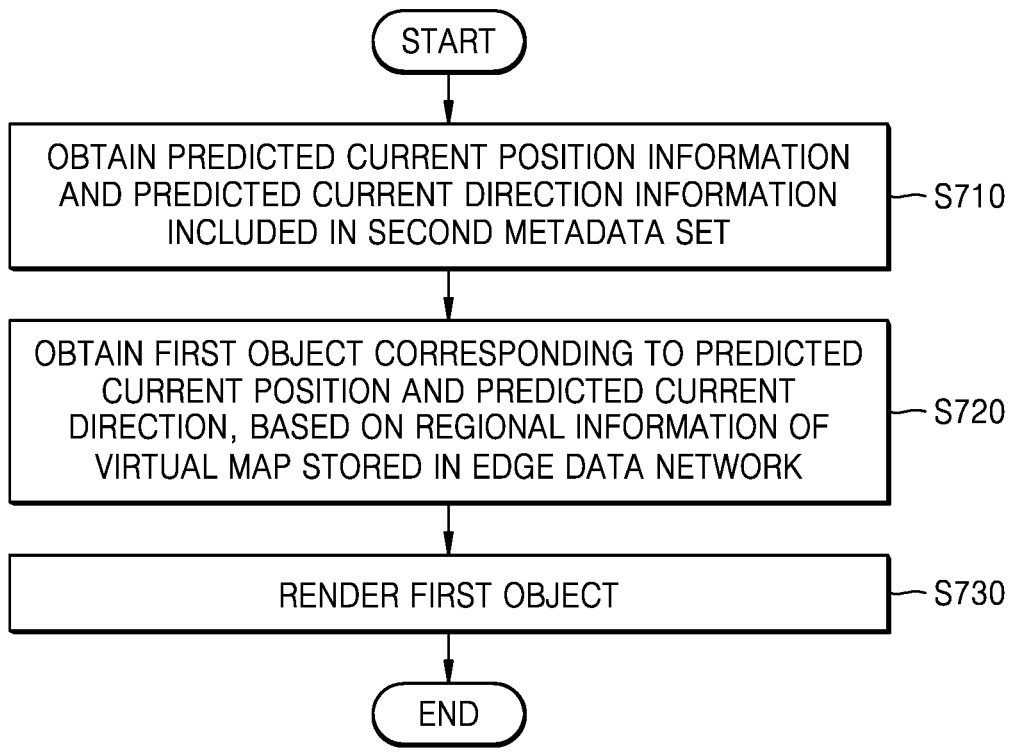
FIG. 7 is a flowchart illustrating an example method of rendering a first object by an edge data network, according to various embodiments.

FIG. 7 is a flowchart illustrating an example method of rendering a first object by the edge data network 130 according to various embodiments.

In operation S710, the edge data network 130 may obtain the predicted current position information and the predicted current direction information included in the second metadata set. The information obtained in operation S710 may correspond to the predicted position information and the predicted direction information of the device 110, which are predicted when the second metadata set described with reference to FIGS. 5 and 6 is generated.

In operation S720, the edge data network 130 may obtain the first object corresponding to the predicted current position and the predicted current direction, based on regional information of a virtual map stored in the edge data network 130.

The virtual map may refer, for example, to information on a three-dimensionally implemented virtual world. The three-dimensionally implemented virtual world may be generated based on real geographical information. For convenient description, the virtual map may be, for example, a three-dimensional map provided by a web portal such as Naver, Daum or Google.

The regional information of the virtual map stored in the edge data network 130 may include information on the object to be displayed on the device 110, corresponding to the position and direction of the device 110. The regional information of the virtual map may also include information on positions on the virtual map corresponding to the real geographic information, objects corresponding to the position and direction of the device 110, the real geographic information, geographic obstacle information, visible distance information, etc.

The geographical obstacle information may refer, for example, to information on features to be considered when displaying the object with respect to the corresponding position and direction, for example, a height or a position of a building located in an area in which the object is displayed, geographical features of the area, and areas in which the object is not visible. For example, the visible distance information may refer to a distance between the object and a position from which the object is viewed, which is to be considered when displaying the object with respect to the position and direction.

The edge data network 130 may render the first object based on the regional information of the virtual map stored in the edge data network 130, considering at least one of geographical obstacles or a visible distance with respect to the first object.

In operation S730, the edge data network 130 may render the obtained first object.

Figure 8:
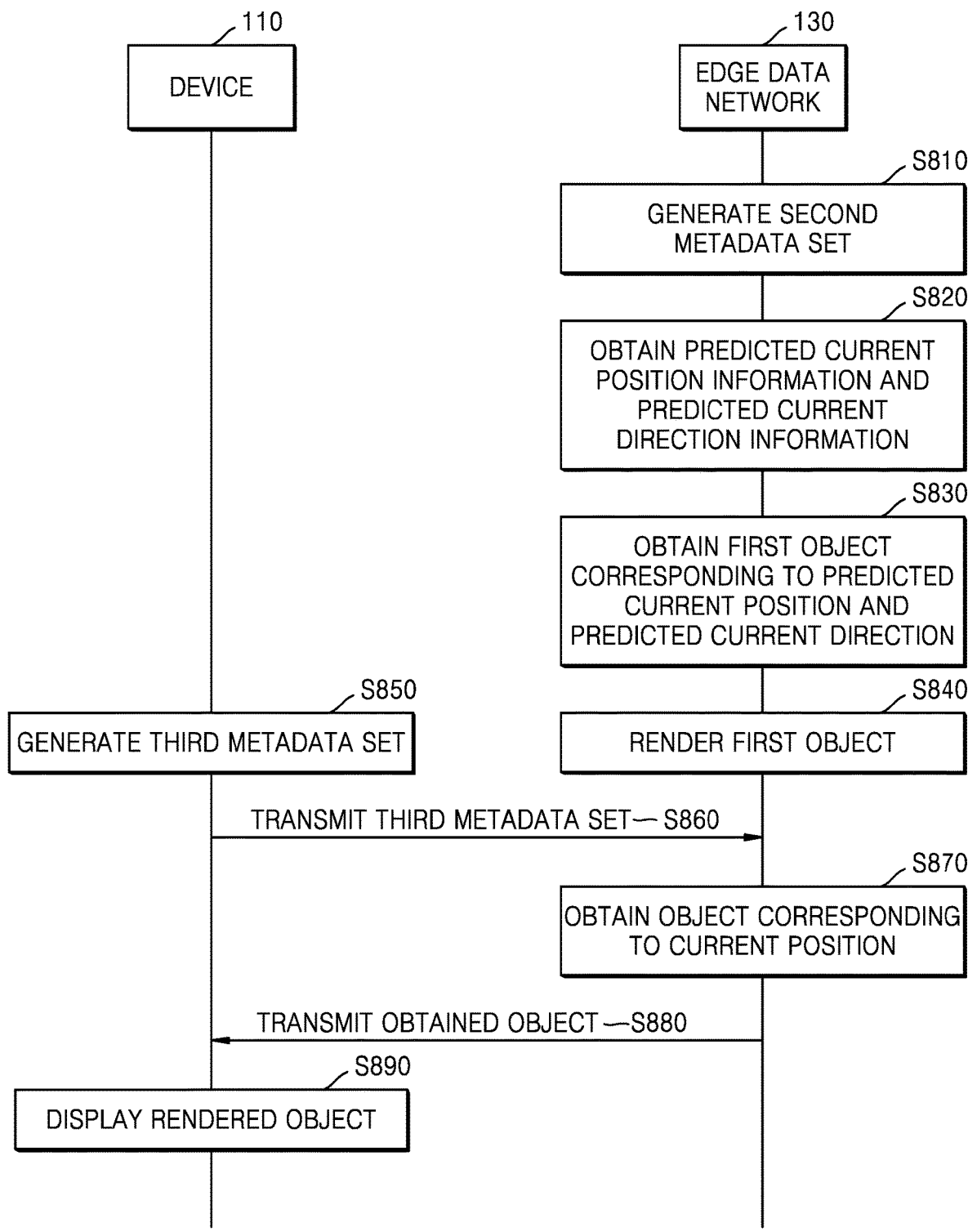
FIG. 8 is a flowchart illustrating example data that an edge data network transmits and receives to and from a device when the edge data network renders a first object, according to various embodiments.

FIG. 8 is a flowchart illustrating example data that the edge data network 130 transmits and receives to and from a device when the edge data network 130 renders a first object, according to various embodiments.

In operation S810, the edge data network 130 may generate the second metadata set. As the method of generating the second metadata set is described in detail with reference to FIGS. 5 and 6, the same description will not be repeated here.

In operation S820, the edge data network 130 may obtain the predicted current position information and the predicted current direction information included in the second metadata set. This may correspond to operation S710.

In operation S830, the edge data network 130 may obtain the first object corresponding to the predicted current position and the predicted current direction. This may correspond to operation S720.

In operation S840, the edge data network 130 may render the first object.

In operation S850, the device 110 may generate the third metadata set and, in operation S860, the device 110 may transmit the third metadata set to the edge data network 130.

In operation S870, the edge data network 130 may obtain an object corresponding the current position of the device 110 and, in operation S880, the edge data network 130 may transmit the obtained object to the device 110.

In operation S890, the device 110 may display the rendered object.

Operations S850 to S890 will be described in detail with reference to the following drawings.

Figure 9:
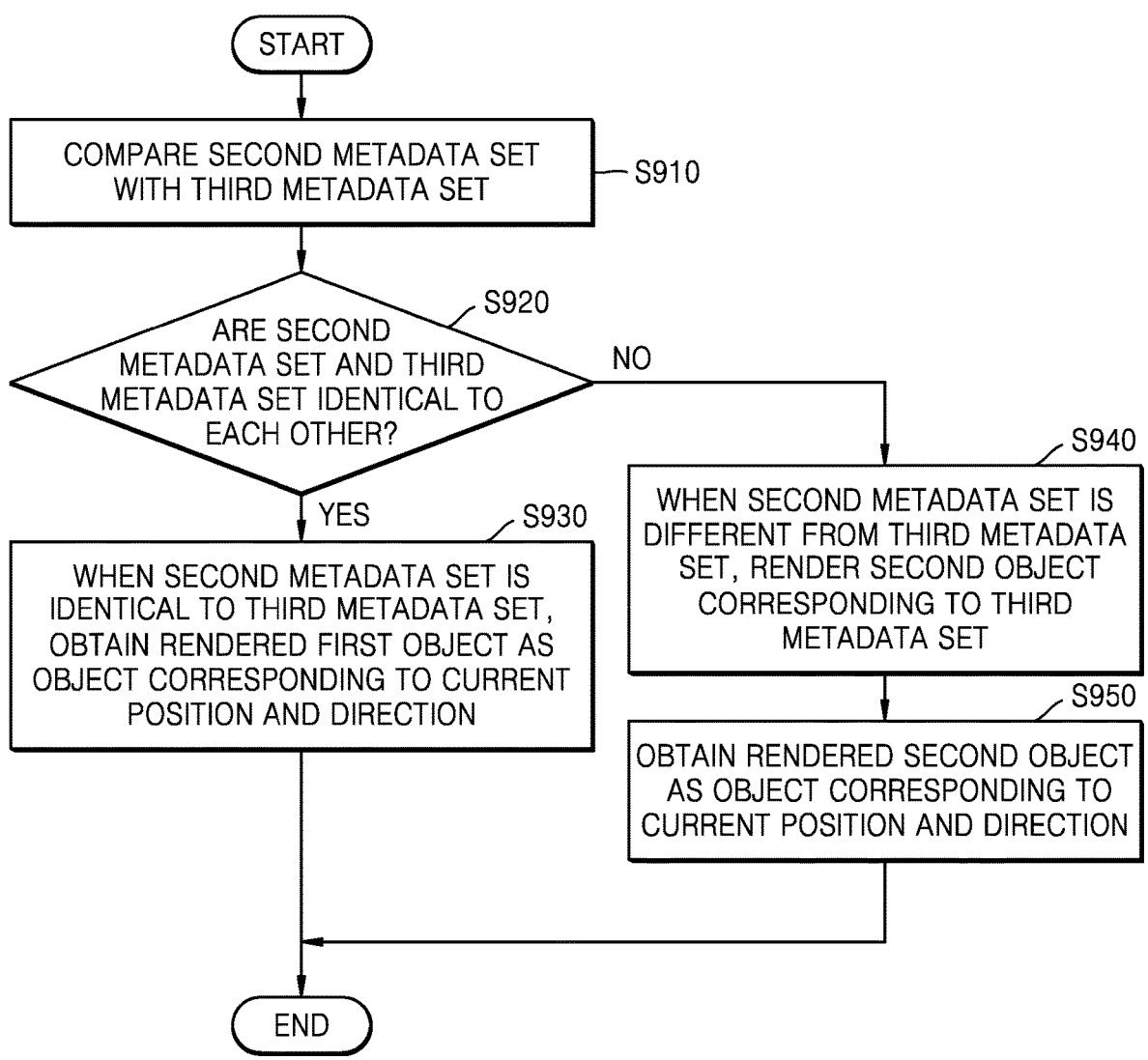
FIG. 9 is a flowchart illustrating an example method of obtaining, by an edge data network, a rendered object corresponding to current position and direction information of a device, according to various embodiments.

FIG. 9 is a flowchart illustrating an example method of obtaining, by the edge data network 130, a rendered object corresponding to current orientation information of the device 110, according to various embodiments.

In operation S910, in a case in which the edge data network 130 obtains the rendered object corresponding to current position and direction information of the device 110 based on the second metadata set and the third metadata set, the edge data network 130 may compare the second metadata set with the third metadata set.

In operation S920, the edge data network 130 may determine whether the second metadata set is identical to the third metadata set. In various embodiments, whether the third metadata set and the second metadata set are identical may be determined according to a predetermined criterion (eg, a predetermined value, a predetermined ratio). For example, the third metadata set and the second metadata set may be considered identical, in case a similarity between the third metadata set and the second metadata set is equal to or greater than the predetermined value. As another example, the third metadata set and the second metadata set may be considered identical, in case that the difference between the third metadata set and the second metadata set is less than some predetermined difference.

In operation S930, in a case in which the second metadata set is identical to the third metadata set, the edge data network 130 may obtain the rendered first object as the object corresponding to the current position and direction of the device 110.

In operation S940, in a case in which the second metadata set is different from the third metadata set, the edge data network 130 may render a second object corresponding to the third metadata set. More specifically, the edge data network 130 may obtain the current position information and the current direction information of the device 110 included in the third metadata set. The current position information of the device 110 included in the third metadata set may refer to information that may objectively indicate the current position of the device 110 when generating the third metadata set. The current direction information of the device 110 included in the third metadata set may refer to information that may objectively indicate the direction that the device 110 faces when generating the third metadata set. In a case in which the device 110 includes a photographing unit (e.g., a camera), the direction information of the device 110 may refer to a direction that the photographing unit of the device 110 faces. In addition, the direction information of the device 110 may be information on a direction in which an image being obtained or being captured by the device 110 is viewed based on a specific position of the device 110.

The edge data network 130 may obtain the second object corresponding to the current position of the device 110 and the current direction of the device 110, based on the regional information of the virtual map stored in the edge data network 130.

In operation S950, the edge data network 130 may obtain a rendered second object as the object corresponding to the current position and direction.

Figure 10:
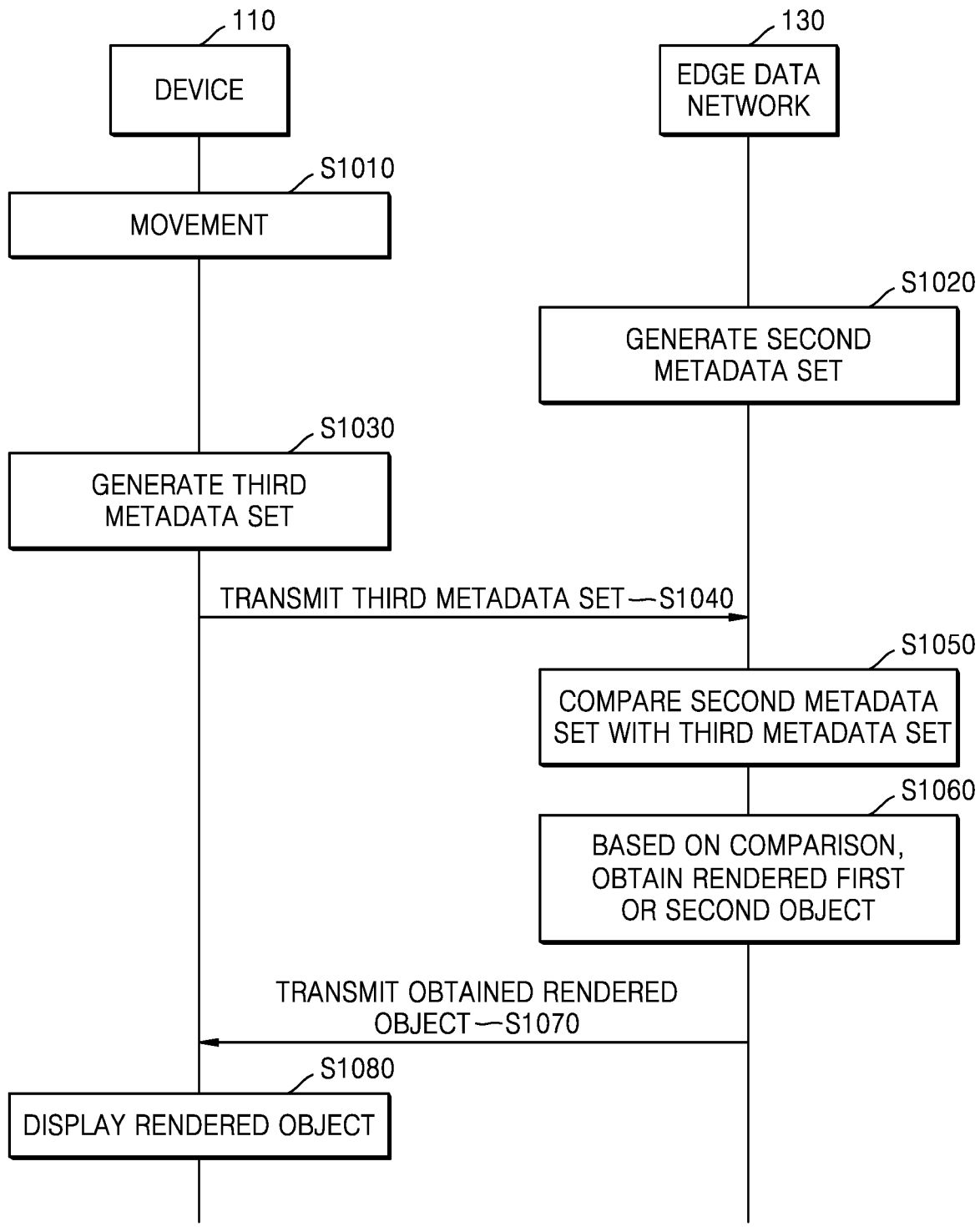
FIG. 10 is a flowchart illustrating example data transmission and reception between an edge data network and a device according to various embodiments.

FIG. 10 is a flowchart illustrating example data transmission and reception between the edge data network 130 and the device 110 according to various embodiments.

More specifically, referring to FIG. 10, in operation S1010, the device 110 may move or be moved to a specific position. For convenient description, device 110 may be assumed to move to the second position 425 of FIG. 4.

In operation S1020, the edge data network 130 may generate the second metadata set.

In operation S1030, the device 110 may generate the third metadata set. In operation S1040, the device 110 may transmit the generated third metadata set to the edge data network 130.

In operation S1050, the edge data network 130 may compare the second metadata set with the third metadata set. In various embodiments, the edge data network 130 may compare the second metadata set with the third metadata set according to a predetermined criterion (e.g., a predetermined value, a predetermined ratio). For example, the edge data network 130 may determine that the third metadata set and the second metadata set are identical, in case a similarity between the third metadata set and the second metadata set is equal to or greater than the predetermined value. As another example, the edge data network 130 may determine that the third metadata set and the second metadata set are identical, in case that the difference between the third metadata set and the second metadata set is less than some predetermined difference.

In operation S1060, in a case in which the second metadata set is identical to the third metadata set, the edge data network 130 may obtain the rendered first object as the object corresponding to the current position and direction of the device 110. In operation S1060, in a case in which the second metadata set is different from the third metadata set, the edge data network 130 may obtain the rendered second object as the object corresponding to the current position and direction of the device 110.

In operation S1070, the edge data network 130 may transmit the obtained rendered object to the device 110.

In operation S1080, the device 110 may display the rendered object.

Figure 11:
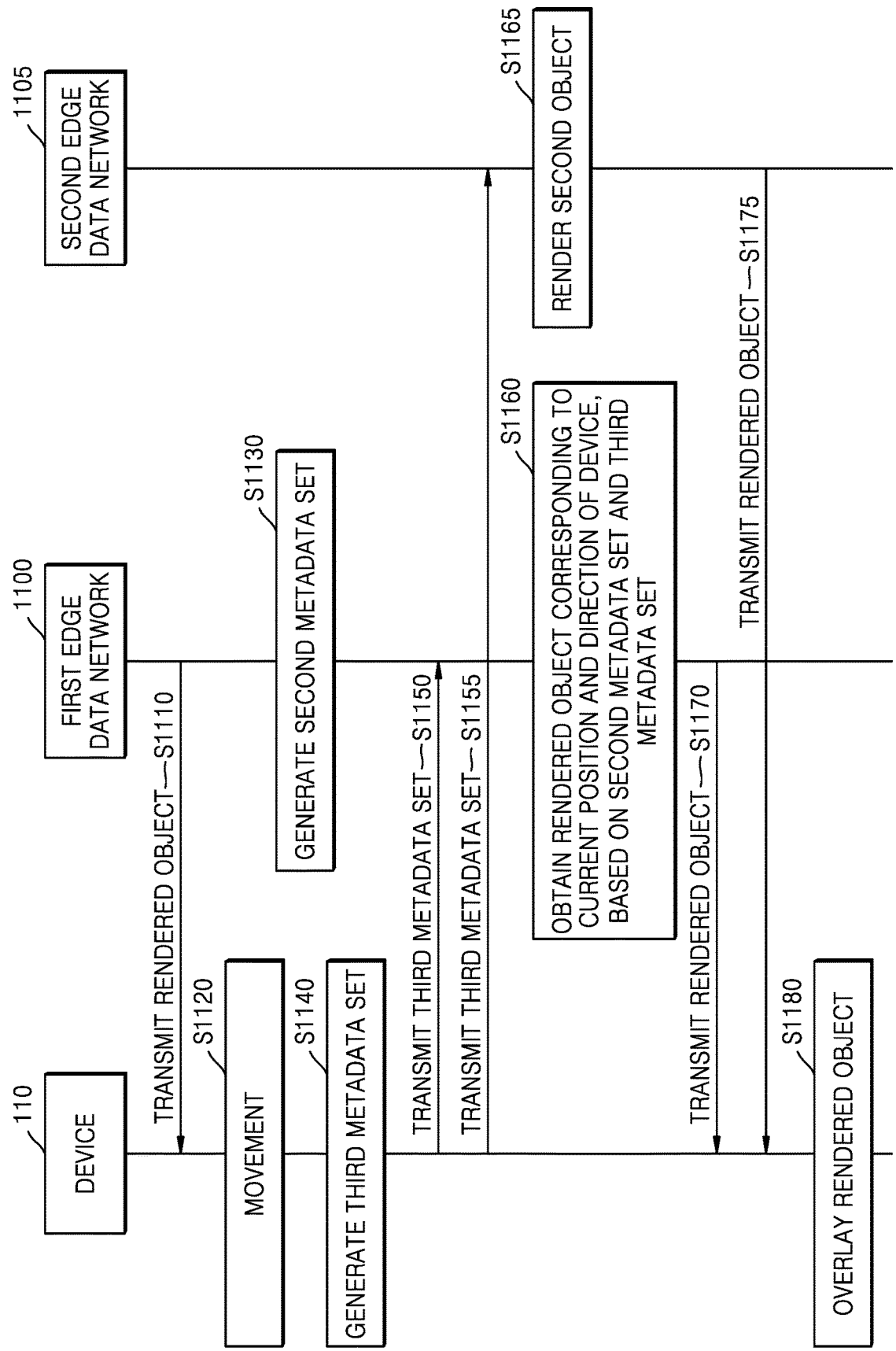
FIG. 11 is a flowchart illustrating example data transmission and reception when a device enters a region that is managed by a plurality of edge data networks, according to various embodiments.

FIG. 11 is a flowchart illustrating example data transmission and reception when the device 110 enters a region that is managed by a plurality of edge data networks, according to various embodiments. In an example embodiment, the device 110 may be in a region in which services are provided by a plurality of edge data networks 130.

For convenient description, a first edge data network 1100 may refer to an edge data network that manages a region in which the device 110 was at a previous time point and that had provided a service to the device 110. A second edge data network 1105 may refer to an edge data network that begins to provide a service to the device 110 as the device 110 enters another region.

In operation S1110, the first edge data network 1100 may transmit the rendered object to the device 110.

In operation S1120, the device 110 may move. The device 110 may enter a region in which both the first edge data network 1100 and the second edge data network 1105 are providing services.

In operation S1130, the first edge data network 1100 may generate the second metadata set based on previously received pieces of metadata.

In operation S1140, the device 110 may generate the third metadata set.

In operation S1150, the device 110 may transmit the third metadata set to the first edge data network 1100. In operation S1155, the device 110 may transmit the third metadata set to the second edge data network 1105.

In operation S1160, the first edge data network 1100 may obtain the rendered object corresponding to the current position and direction of the device 110, based on the second metadata set and the third metadata set. Here, in a case in which the second metadata set is identical to the third metadata set, the first edge data network 1100 may obtain the rendered first object. In addition, in a case in which the second metadata set is different from the third metadata set, the first edge data network 1100 may obtain the rendered second object.

In operation S1165, the second edge data network 1105 may obtain the second object based on the third metadata set. This may correspond to the case described above with reference to FIGS. 9 and 10, in which the second metadata set is different from the third metadata set, and the edge data network obtains and renders the second object based on the third metadata set.

In operation S1170, the first edge data network 1100 may transmit the rendered object to the device 110.

In operation S1175, the second edge data network 1105 may transmit the rendered second object to the device 110.

In operation S1180, the device 110 may display (e.g., by overlaying) the rendered object. Here, for example, the device 110 may display the rendered object that is first received from the first edge data network 1100 or the second edge data network 1105.

In a case in which the device 110 is continuously moving in the region managed by the plurality of edge data networks, the device 110 may transmit the first metadata set and the third metadata set to each of the plurality of edge data networks. Then, the plurality of edge data networks may perform prediction, and each edge data network may generate the second metadata set. In addition, each of the plurality of edge data networks may obtain the rendered object corresponding to the current position and direction of the device 110 by comparing the second metadata set with the third metadata set, and may transmit the obtained rendered object to the device 110.

Figure 12:
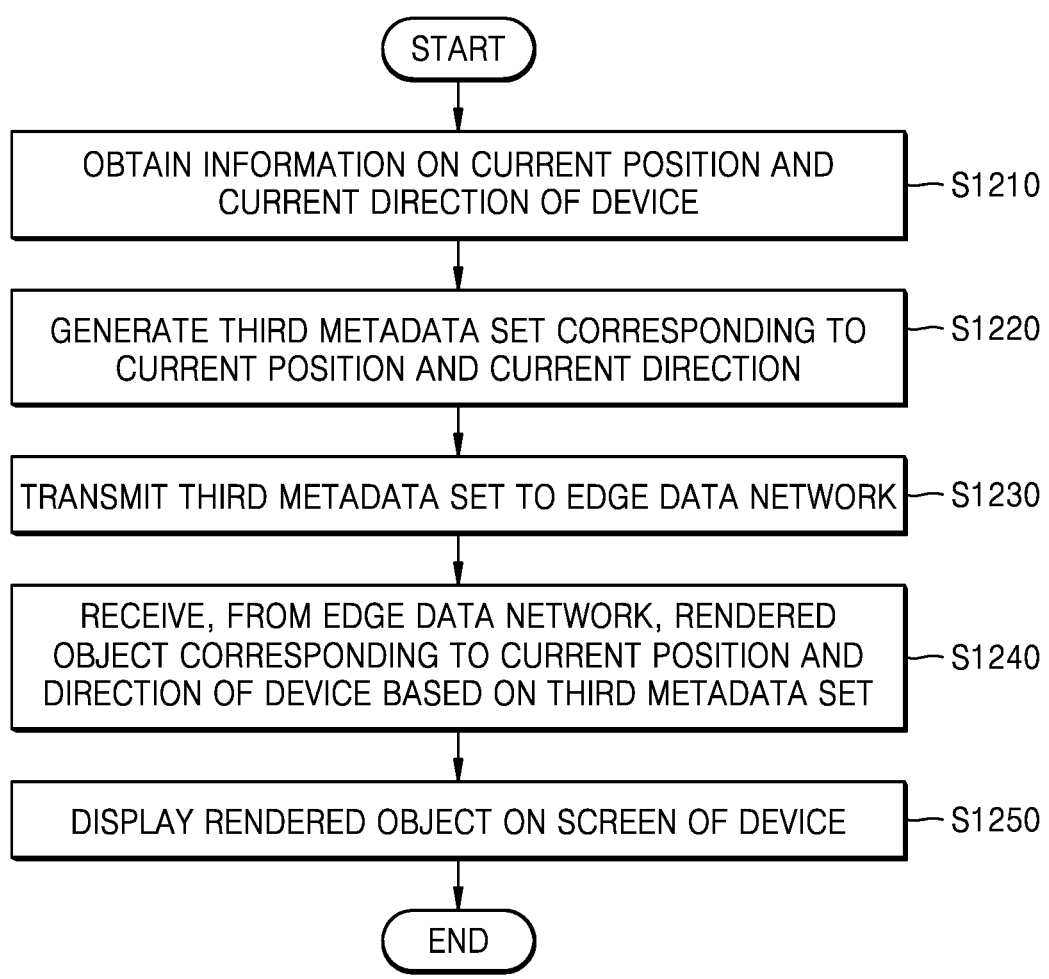
FIG. 12 is a flowchart illustrating an example method of displaying a rendered object on a device, according to various embodiments.

FIG. 12 is a flowchart illustrating an example method of displaying a rendered object on the device 110, according to various embodiments.

In operation S1210, the device 110 may obtain information on the current position and the current direction of the device 110.

In operation S1220, the device 110 may generate the third metadata set corresponding to the current position and the current direction.

According to various embodiments, the information on the current position of the device 110 included in the third metadata set may be generated, for example, based on data values obtained from a GPS sensor.

According to various embodiments, the information on the current direction of the device 110 included in the third metadata set may be generated based on data values obtained from an acceleration sensor.

Before transmitting the third metadata set to the edge data network 130 in operation S1230, the device 110 may transmit the first metadata set corresponding to the position and direction of the device 110 to the edge data network 130. More specifically, before transmitting the third metadata set to the edge data network 130, the device 110 may transmit metadata corresponding to the previous time point to the edge data network 130.

In operation S1230, the device 110 may transmit the third metadata set to the edge data network 130.

In operation S1240, the device 110 may receive, from the edge data network 130, the rendered object corresponding to the current position and direction of the device 110 based on the third metadata set.

According to various embodiments, the rendered object may be an object obtained based on the second metadata set generated from the first metadata set, and the third metadata set. More specifically, according to various embodiments, the rendered object may be an object obtained based on the second metadata set generated from the first metadata set including the at least one piece of metadata corresponding to the position and direction of the device, and third metadata set.

In operation S1250, the device 110 may display the rendered object on a screen of the device 110.

According to various embodiments, the device 110 may overlay the rendered object received from the edge data network 130, on an image that is being captured by the device 110.

Figure 13:
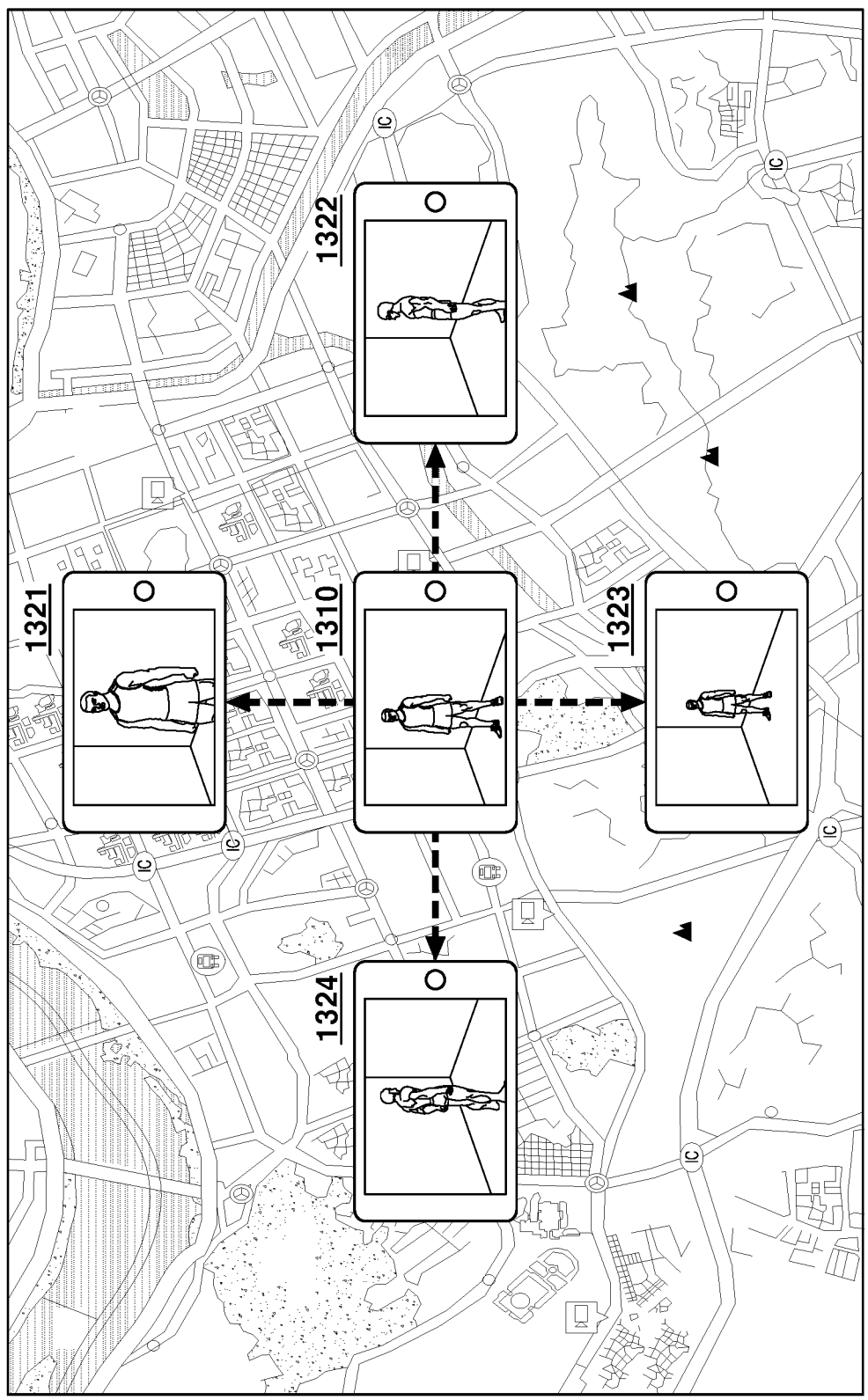
FIG. 13 illustrates an example object overlaid on a screen of a device, according to various embodiments.

FIG. 13 illustrates an example object overlaid on a screen of the device 110, according to various embodiments.

For convenient description, device 110 may be assumed to have moved from the first position 420 to the second position 425 with reference to FIG. 4. In this case, it may be assumed that an object A 1310 was displayed at the first position 420, which is a previous position of the device 110. It may be also assumed that an object displayed at the second position 425, which is the current position of the device 110, is an object B 1321, an object C 1322, an object D 1323, or an object E 1324.

More specifically, referring to FIG. 13, in a case in which the device 110 has moved forward from the first position 420, the object B 1321 may be overlaid and displayed on the screen of the device 110. Alternatively, in a case in which the device 110 has moved backward from the first position 420, the object D 1323 may be overlaid and displayed on the screen of the device 110. Alternatively, in a case in which the device 110 has moved to the left from the first position 420, the object E 1324 may be overlaid and displayed on the screen of the device 110. Alternatively, in a case in which the device 110 has moved to the right from the first position 420, the object C 1322 may be overlaid and displayed on the screen of the device 110. For convenient description, a movement of the device 110 has been described in front (forward), rear (backward), left, and right directions, but the direction of movement is not limited thereto.

Referring to FIG. 13, the edge data network 130 may predict that the device 110 will move forward from the first position 420 based on the metadata received from the device 110 at the first position 420 or other previous positions. The edge data network 130 may render the object B 1321 in advance in preparation for the device 110 to move forward from the first position 420. In a case in which the device 110 has actually moved forward from the first position 420, the edge data network 130 may store a rendered object B 1321 to be transmitted to the device 110.

In addition, in a case in which the device 110 has moved forward from the first position 420 as predicted by the edge data network 130, the third metadata set transmitted from the device 110 at the second position 425 and the second metadata set may be identical to each other. In this case, the edge data network 130 may transmit the rendered object B 1321 to the device 110.

Alternatively, in a case in which the device 110 has moved backward from the first position 420 against or contrary to what the edge data network 130 predicted, the third metadata set transmitted from the device 110 at the second position 425 and the second metadata set may be different from each other. In this case, the edge data network 130 may obtain the object D 1323 to be displayed at the second position 425, based on the third metadata set corresponding to the second position 425. The object D 1323 may correspond to the second object.

Figure 14A:
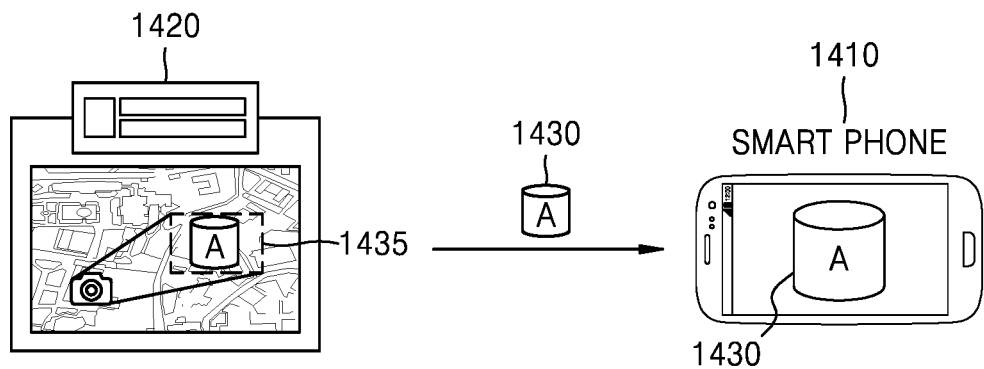
FIGS. 14A and 14B are flowcharts illustrating an example rendered object being received from an edge data network and displayed, by a smart phone, according to various embodiments.
Figure 14B:
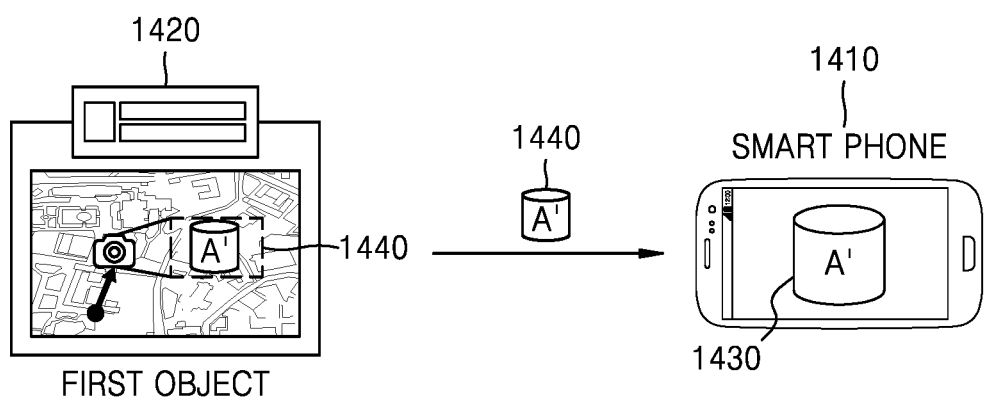

FIGS. 14A and 14B are flowcharts illustrating an example rendered object being received from an edge data network 1420 and displayed, by a smart phone 1410, according to various embodiments.

According to various embodiments, the device 110 may correspond to the smart phone 1410. For convenient description, FIG. 14 illustrates the smart phone 1410, but the disclosure is not limited thereto.

First, FIG. 14A illustrates a case in which the smart phone 1410 starts a service of receiving the rendered object provided by the edge data network 1420. That is, in this case, there is no object rendered by the edge data network 1420 by predicting a position to which the smart phone 1410 will move.

In this case, the edge data network 1420 may transmit, to the smart phone 1410, an object 1430 corresponding to current position and direction information. More specifically, the smart phone 1410 may transmit metadata corresponding to current position and direction information of the smart phone 1410 to the edge data network 1420. Here, according to various embodiments, the metadata may correspond to the position and direction information of the smart phone 1410 at a current time point, and thus may correspond to the third metadata set.

The edge data network 1420 may render the object 1430 corresponding to the metadata, considering the regional information of the virtual map stored in the edge data network. This may refer, for example, to the edge data network 1420 performing metadata-based virtual object view rendering on the virtual map (three-dimensional virtual world). Here, the edge data network 1420 may render the object 1430 based on a collision between a user's visible distance and a building or the like. The edge data network 1420 may transmit the rendered object 1430 to the smart phone 1410. The smart phone 1410 may display the rendered object 1430.

As described above, in a case in which there is no metadata received from the smart phone 1410 by the edge data network 1420, a second object 1430 may be rendered based on the third metadata set transmitted from the smart phone 1410. In a case in which the smart phone 1410 starts the service of receiving the rendered object provided by the edge data network 1420, the edge data network 1420 may not have metadata previously received from the smart phone 1410. In this case, the edge data network 1420 may transmit, to the smart phone 1410, the second object 1430 corresponding to the third metadata set. Referring to FIG. 14A, the edge data network 1420 may render the second object 1430 corresponding to the third metadata set and transmit the rendered second object 1430 to the smart phone 1410. The smart phone 1410 may display the rendered second object 1430.

FIG. 14B illustrates a case in which the edge data network 1420 predicts the direction of movement of the device to perform object rendering. The edge data network 1420 may generate the second metadata set by predicting a direction of movement and destination of the smart phone 1410 based on accumulated metadata and the regional information of the virtual map. The edge data network 1420 may render a first object 1440 corresponding to the second metadata set.

While the smart phone 1410 is displaying the rendered second object 1430, the smart phone 1410 may move and then transmit, to the edge data network 1420, the third metadata set corresponding to a current position and direction of the smart phone 1410. The edge data network 1420 may compare the third metadata set with the second metadata set. In various embodiments, the edge data network 1420 may compare the second metadata set with the third metadata set according to a predetermined criterion (e.g., a predetermined value, a predetermined ratio). For example, the edge data network 1420 may determine that the third metadata set and the second metadata set are identical, in case a similarity between the third metadata set and the second metadata set is equal to or greater than the predetermined value. As another example, the edge data network 1420 may determine that the third metadata set and the second metadata set are identical, in case that the difference between the third metadata set and the second metadata set is less than some predetermined difference. In a case in which the third metadata set is identical to the second metadata set, the edge data network 1420 may transmit the first object 1440, which is rendered in advance, to the smart phone 1410. The smart phone 1410 may display the received rendered first object 1440 as shown in FIG. 14B.

Figure 15:
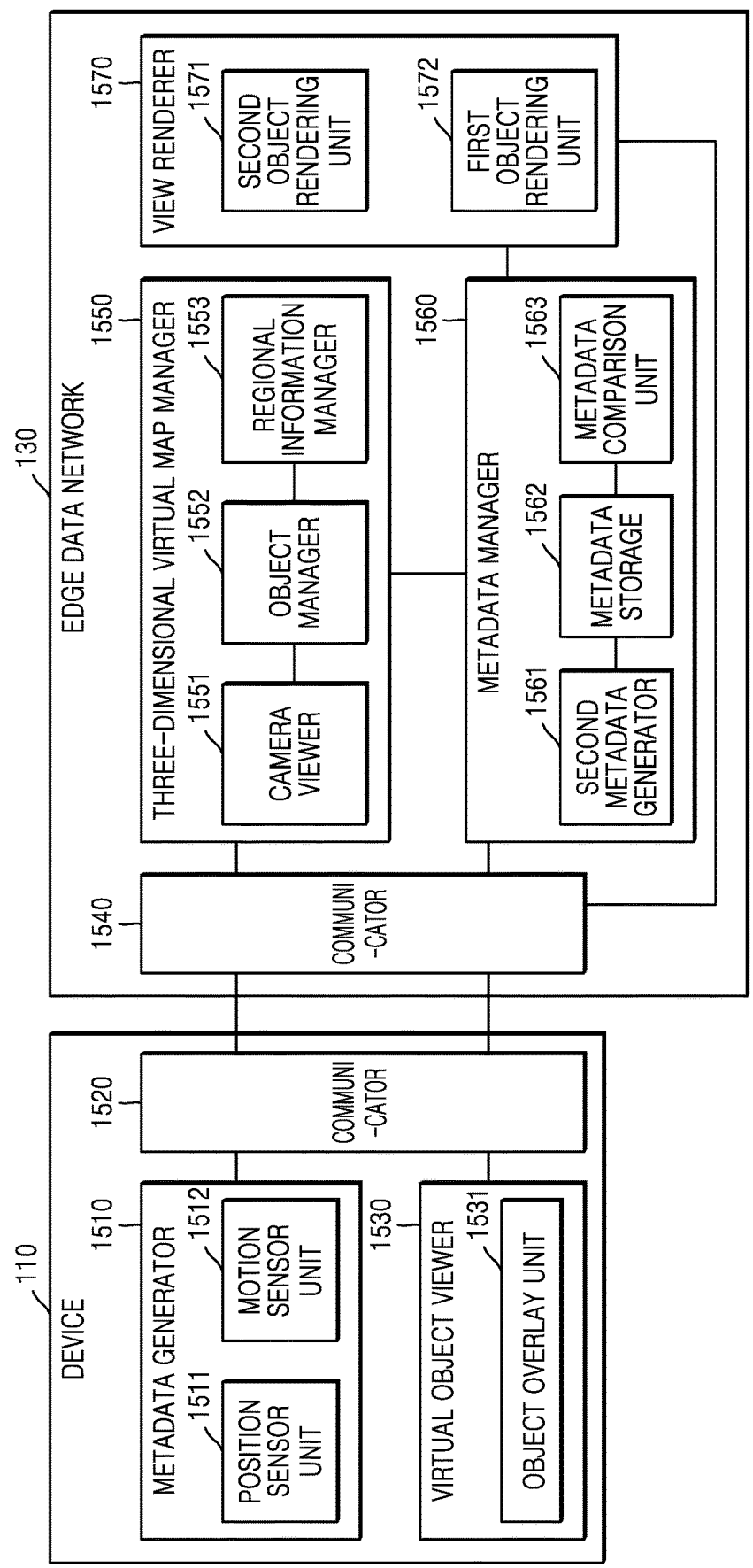
FIG. 15 is a block diagram illustrating an example device and an example edge data network, according to various embodiments.

FIG. 15 is a block diagram illustrating an example device 110 and an example edge data network 130 according to various embodiments.

The device 110 may include a metadata generator 1510, a communicator (including communication circuitry) 1520, and a virtual object viewer 1530.

For example, the metadata generator 1510 may include a position sensor unit 1511 and a motion sensor unit 1512. The position sensor unit 1511 may obtain the current position information of the device 110 from sensors for measuring a position of the device 110. For example, the sensors for measuring the position of the device 110 may include a GPS sensor. The motion sensor unit 1512 may obtain the current direction information of the device 110 from sensors for measuring a direction of the device 110. For example, the sensors for measuring the direction of the device 110 may include inertial sensors such as an acceleration sensor.

The communicator 1520 may transmit the metadata generated by the device 110 to a communicator (including communication circuitry) 1540 of the edge data network 130. In addition, the communicator 1520 may receive an object rendered by the edge data network 130 from the communicator 1540 of the edge data network 130.

The virtual object viewer 1530 may include an object overlay unit 1531. The object overlay unit 1531 may overlay the rendered object received from the edge data network 130 on the screen of the device 110 for display on a display (e.g., an LCD or OLED display) of the device 110.

The edge data network 130 may include the communicator 1540, a three-dimensional virtual map manager 1550, a metadata manager 1560, and a view renderer 1570.

The communicator 1540 may receive the metadata generated by the device 110, from the communicator 1520 of the device 110. The communicator 1540 may also transmit the object rendered by the edge data network 130 to the communicator 1520 of the device 110.

The three-dimensional virtual map manager 1550 may include a camera viewer 1551, an object manager 1552, and a regional information manager 1553. The camera viewer 1551 may manage information on an image displayed on the device 110 in consideration of the position or direction of the device 110. The object manager 1552 may manage the object. The regional information manager 153 may manage the regional information of the virtual map stored in the edge data network 130.

The metadata manager 1560 may include a metadata comparison unit 1563, a metadata storage 1562, and a second metadata generator 1561. The metadata comparison unit 1563 may compare the second metadata set with the third metadata set. The metadata storage 1562 may store the second metadata set generated by the edge data network 130. The metadata storage 1562 may also store the metadata received from the device 110, and for example, the metadata storage 1562 may store pieces of metadata included in the first metadata set, and the third metadata set. The second metadata generator 1561 may generate the second metadata set in the above-described manner.

The view renderer 1570 may include a second object rendering unit 1571 and a first object rendering unit 1572. The second object rendering unit 1571 may render the second object corresponding to the third metadata set. According to various embodiments, the second object rendering unit 1571 may render the second object corresponding to the third metadata set in a case in which the device 110 first starts a rendering service provided by the edge data network 130 and the edge data network 130 does not have the metadata for prediction. In addition, the second object rendering unit 1571 may render the second object corresponding to the third metadata set in a case in which the second metadata set and the third metadata set are different from each other. The first object rendering unit 1572 may render the first object corresponding to the second metadata set. The first object rendering unit 1572 may also store the rendered first object.

Figure 16:
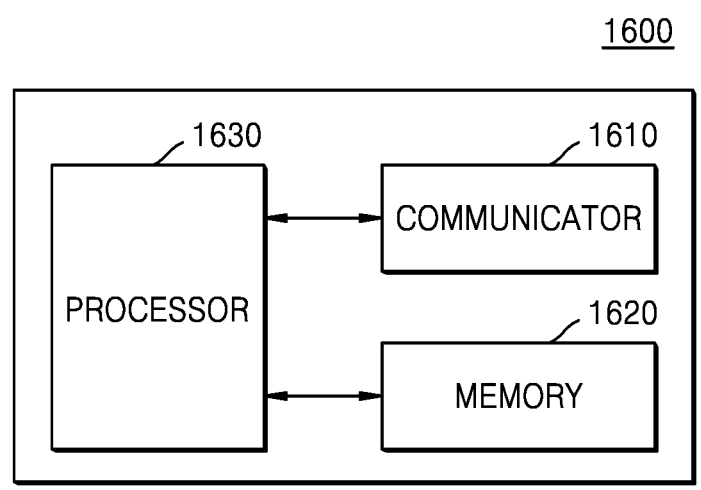
FIG. 16 is a block diagram illustrating an example configuration of an edge data network according to various embodiments.
Figure 17:
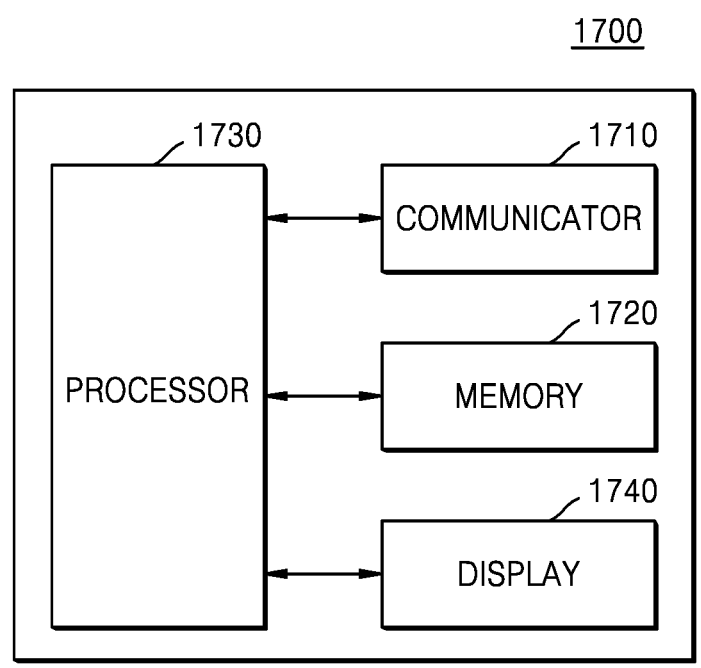
FIG. 17 is a block diagram illustrating an example configuration of a device according to various embodiments.

FIGS. 16 and 17 illustrate example configurations of the edge data network 130 and the device 110 according to various embodiments.

FIG. 16 is a block diagram illustrating an example edge data network 1600 according to various embodiments.

As shown in FIG. 16, the edge data network 1600 may include a processor 1630, a communicator (including communication circuitry) 1610, and a memory 1620. The edge data network 1600 may correspond to the edge data network 130. However, components of the edge data network 1600 are not limited to the components illustrated in FIG. 16. For example, the edge data network 1600 may include more or fewer components than the above-described components. In addition, the processor 1630, the communicator 1610, and the memory 1620 may be implemented as a single chip.

The edge data network 1600 may perform rendering of the object as described in connection with the various embodiments, and thus this description will not be repeated. According to various embodiments, the communicator 1540 may correspond to the communicator 1610 of FIG. 16. In addition, the three-dimensional virtual map manager 1550 may correspond to the memory 1620 of FIG. 16. Furthermore, the metadata manager 1560 and the view renderer 1570 may correspond to the processor 1630 of FIG. 16.

According to various embodiments, the processor 1630 may control a series of operations of the edge data network 1600 according to the above-described example embodiments. For example, the processor 1630 may control elements of the edge data network 1600 to perform a method of providing an object rendering service according to the various embodiments. A plurality of processors 1630 may be provided, and the processor 1630 may perform an operation for providing the object rendering service by executing a program stored in the memory 1620.

The communicator 1610 may transmit and receive signals to and from an external device (e.g., the terminal 110, the access network 120, a remote server, a 3GPP network, or the like). The signals transmitted and received to and from the external device may include control information and data. The communicator 1610 may include a radio frequency (RF) transmitter for up-converting and amplifying frequencies of signals being transmitted, and an RF receiver for low-noise-amplifying and down-converting signals being received. However, these are merely examples, and elements of the communicator 1610 are not limited to the RF transmitter and the RF receiver. The communicator 1610 may receive a signal through a wireless channel and output the signal to the processor 1630, and may transmit a signal output from the processor 1630 through the wireless channel.

According to various embodiments, the memory 1620 may store programs and data necessary for an operation of the edge data network 1600. In addition, the memory 1620 may store control information or data included in a signal(s) transmitted and received by the edge data network 1600. The memory 1620 may be a storage medium such as a ROM, a RAM, a hard disk, a CD-ROM, a DVD, or the like, or a combination of storage media. A plurality of memories 1620 may be provided. According to various embodiments, the memory 1620 may store a program for performing an operation of providing the object rendering service, as described above.

According to various embodiments, the processor 1630 may generate the second metadata set corresponding to the predicted position and direction of the device 110 based on the first metadata set, and render the first object corresponding to the second metadata set. The processor 1630 may also control the communicator 1610 to receive, from the device 110, the third metadata set corresponding to the current position and direction of the device 110, and may further control the communicator 1610 to obtain the object corresponding to the current position and direction of the device 110 based on the second metadata set and the third metadata set, and to transmit the obtained object to the device 110. Here, the first metadata set may include at least one piece of metadata received from the device 110 before receiving the third metadata set.

According to various embodiments, in a case in which the second metadata set is identical to the third metadata set, the processor 1630 may obtain the rendered first object as the object corresponding to the current position and direction.

According to various embodiments, the processor 1630 may obtain the position information of the device 110 and the direction information of the device 110 that correspond to the first metadata set, predict the current position and direction of the device 110 based on the position information of the device 110 and the direction information of the device 110, and generate the second metadata set corresponding to information on the predicted current position and information on the predicted current direction.

According to various embodiments, the processor 1630 may obtain the predicted current position information and the predicted current direction information included in the second metadata set, and may obtain the first object corresponding to the predicted current position and the predicted current direction, based on the regional information of the virtual map stored in the edge data network.

According to various embodiments, in a case in which the second metadata set is different from the third metadata set, the processor 1630 may render the second object corresponding to the third metadata set, and obtain the rendered second object as the object corresponding to the current position and direction.

FIG. 17 is a block diagram illustrating an example device 1700 according to various embodiments.

Referring to FIG. 17, the device 1700 may include a processor 1730, a communicator (including communication circuitry) 1710, a memory 1720, and a display 1740. The device 1700 may correspond to the device 110. However, components of the device 1700 are not limited to the above-described examples. For example, the device 1700 may include more or fewer components than the above-described components. In addition, the processor 1730, the communicator 1710, and the memory 1720 may be implemented as a single chip.

The device 1700 may perform a method of displaying an object rendered as described with reference to the various example embodiments, and descriptions of the operations will not be repeated here. According to various embodiments, the communicator 1520 may correspond to the communicator 1710 of FIG. 17. The metadata generator 1510 may correspond to the processor 1730 of FIG. 17. The virtual object viewer 1530 may correspond to the display 1740 of FIG. 17.

The processor 1730 may control a series of operations of the device 1700 according to the various above-described example embodiments. For example, elements of the device 1700 may be controlled to perform the method of displaying a rendered object, according to the various example embodiments. A plurality of processors 1730 may be provided, and the processor 1730 may perform an operation for displaying the rendered object by executing a program stored in the memory 1720.

The communicator 1710 may transmit and receive signals to and from an external device (for example, the access network 120, the edge data network 130, the remote server 140, or a 3GPP network). The signals transmitted and received to and from the external device may include control information and data. The communicator 1710 may include an RF transmitter for up-converting and amplifying frequencies of signals being transmitted, and an RF receiver for low-noise-amplifying and down-converting signals being received. However, these are merely example, and elements of the communicator 1710 are not limited to the RF transmitter and the RF receiver. The communicator 1710 may receive a signal(s) through a wireless channel and output the signal to the processor 1730, and may transmit a signal output from the processor 1730 through the wireless channel.

According to various embodiments, the memory 1720 may store programs and data necessary for an operation of the device 1700. In addition, the memory 1720 may store control information or data included in a signal(s) transmitted and received by the device 1700. The memory 1720 may be a storage medium such as a ROM, a RAM, a hard disk, a CD-ROM, a DVD, or the like, or a combination of storage media. A plurality of memories 1720 may be provided. The memory 1720 may store a program for performing an operation of providing the object rendering service, as described above in connection with the various example embodiments.

According to various embodiments, the processor 1730 may obtain the current position information and the current direction information of the device, and may generate the third metadata set corresponding to the current position and the current direction. The processor 1730 may also control the communicator 1710 to transmit the third metadata set to the edge data network 130, may further control the communicator 1710 to receive, from the edge data network, the rendered object corresponding to the current position and direction of the device based on the third metadata set, and may control the display 1740 to display the rendered object.

According to various embodiments, the processor 1730 may transmit the metadata corresponding to the position and direction of the device 1700 to the edge data network 130, before transmitting the third metadata set to the edge data network 130. The rendered object may be an object obtained based on the second metadata set generated from the first metadata set including at least one piece of metadata, and the third metadata set.

Methods according to various example embodiments stated in the claims and/or specification of the disclosure may be implemented in hardware, software, or a combination of hardware and software.

When the methods are implemented in software, a computer-readable storage medium (e.g., a non-transitory computer-readable storage medium) or computer program product for storing at least one program (software module) may be provided. The at least one program stored in the computer-readable storage medium or computer program product may be configured for execution by at least one processor within an electronic device. The at least one program may include instructions that cause the electronic device to perform the methods according to embodiments stated in the claims and/or specification of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other types of optical storage devices, or a magnetic cassette. Alternatively, any combination of some or all of the above may form a memory in which the program is stored. Further, a plurality of such memories may be included in the electronic device.

In addition, the programs may be stored in an attachable storage device which is accessible through communication networks such as the Internet, Intranet, local area network (LAN), wide local area network (WLAN), or storage area network (SAN), or a combination thereof. Such a storage device may access a device for performing an embodiment of the disclosure via an external port. Further, a separate storage device on the communication network may access the device for performing an embodiment of the disclosure.

In the disclosure, the term "computer program product" or "computer-readable medium" is used to generally refer to a medium such as a memory, a hard disc installed in a hard disc drive, or a signal. The "computer program product" or "computer-readable recording medium" is to be provided to a software computer system, and includes, for example, instructions for generating the second metadata set corresponding to the predicted position and direction of the device based on the first metadata set, rendering the first object corresponding to the second metadata set, receiving, from the device, the third metadata set corresponding to the current position and direction of the device, obtaining the rendered object corresponding to the current position and direction of the device based on the second metadata set and the third metadata set, and transmitting the obtained rendered object to the device, according to an embodiment of the disclosure.

The various example embodiments provide methods of enabling an edge data network to effectively render an object and enabling a device to effectively display the rendered object.

However, effects that may be achieved by the method and apparatus for rendering an object according to an embodiment of the disclosure are not limited to the above-mentioned effects, and other effects that are not mentioned may be clearly understood by those of skill in the art from the description herein.

In the above-described embodiments of the disclosure, an element included in the disclosure is expressed in the singular or the plural according to a presented example embodiment. However, the singular form or plural form is selected appropriately to the presented situation for the convenience of description, and the disclosure is not limited by elements expressed in the singular or the plural. Further, either multiple elements expressed in the description may be configured as a single element or a single element in the description may be configured as multiple elements.

While the disclosure has been illustrated and described with reference to various example embodiments, it will be understood that the various example embodiments are intended to be illustrative, not limiting. It will be further understood that modifications and changes may be made thereto without departing from the true spirit and scope of the disclosure, including the appended claims and equivalents thereof.

What is claimed is:

1. A method, performed by an edge data network, of rendering an object, the method comprising:
generating a second metadata set corresponding to a position and direction of a device predicted based on a first metadata set;
rendering a first object corresponding to the second metadata set;
wherein the rendering of the first object corresponding to the second metadata set comprises:
obtaining predicted current position information and predicted current direction information included in the second metadata set; and
obtaining the first object corresponding to a predicted current position and a predicted current direction, based on regional information of a virtual map sored in the edge data network;
receiving, from the device, a third metadata set corresponding to a current position and direction of the device;
obtaining a rendered object corresponding to the current position and direction of the device, based on the second metadata set and the third metadata set; and
transmitting the obtained rendered object to the device,
wherein the first metadata set includes at least one piece of metadata that is received from the device before the third metadata set is received.

2. The method of claim 1, wherein the obtaining of the object corresponding to the current position and direction of the device comprises, in a case in which the second metadata set is identical to the third metadata set, obtaining the rendered first object as the object corresponding to the current position and direction.

3. The method of claim 1, wherein the generating of the second metadata set comprises:
obtaining position information of the device and direction information of the device, that correspond to the first metadata set;
predicting the current position and direction of the device based on the position information of the device and the direction information of the device; and
generating the second metadata set corresponding to information of the predicted current position and information of the predicted current direction.

4. The method of claim 1, wherein the rendering of the first object corresponding to the second metadata set further comprises rendering the first object based on the regional information of the virtual map stored in the edge data network, based on at least one of geographical obstacles or a visible distance with respect to the first object.

5. The method of claim 1, wherein the regional information of the virtual map stored in the edge data network includes information on the first object to be displayed on the device, corresponding to the position and direction of the device.

6. The method of claim 1, wherein the obtaining of the object corresponding to the current position and direction of the device comprises:
in a case in which the second metadata set is different from the third metadata set, rendering a second object corresponding to the third metadata set; and
obtaining the rendered second object as the object corresponding to the current position and direction.

7. The method of claim 6, wherein the rendering of the second object corresponding to the third metadata set comprises:
obtaining current position information and current direction information of the device included in the third metadata set; and
obtaining the second object corresponding to the current position of the device and the current direction of the device, based on regional information of a virtual map stored in the edge data network.

8. An edge data network for rendering an object, the edge data network comprising:
a communicator including communication circuitry configured to communicate with a device;
a memory configured to store at least one instruction; and
at least one processor configured to execute the at least one instruction to control the edge data network to:
obtain predicted current position information and predicted current direction information included in the second metadata set,
obtain the first object corresponding to a predicted current position and a predicted current direction, based on regional information of a virtual map stored in the edge data network,
generate a second metadata set corresponding to a position and direction of the device predicted based on a first metadata set,
render a first object corresponding to the second metadata set,
control the communicator to receive, from the device, a third metadata set corresponding to a current position and direction of the device,
obtain an object corresponding to the current position and direction of the device based on the second metadata set and the third metadata set, and
control the communicator to transmit the obtained object to the device, and
wherein the first metadata set includes at least one piece of metadata that is received from the device before the third metadata set is received.

9. The edge data network of claim 8, wherein the at least one processor is further configured to execute the at least one instruction to control the edge data network, in a case in which the second metadata set is identical to the third metadata set, obtain the rendered first object as the object corresponding to the current position and direction.

10. The edge data network of claim 8, wherein the at least one processor is further configured to execute the at least one instruction to control the edge data network to:
obtain position information of the device and direction information of the device, that correspond to the first metadata set,
predict the current position and direction of the device based on the position information of the device and the direction information of the device, and
generate the second metadata set corresponding to information of the predicted current position and information of the predicted current direction.

11. The edge data network of claim 8, wherein the at least one processor is further configured to execute the at least one instruction to control the edge data network to in a case in which the second metadata set is different from the third metadata set, render a second object corresponding to the third metadata set, and obtain the rendered second object as the object corresponding to the current position and direction.

* * * * *